US012293405B2

(12) United States Patent
Andon et al.

(10) Patent No.: US 12,293,405 B2
(45) Date of Patent: *May 6, 2025

(54) EVENT-BASED DISTRIBUTION OF CRYPTOGRAPHICALLY SECURED DIGITAL ASSETS

(71) Applicant: NIKE, Inc., Beaverton, OR (US)

(72) Inventors: Christopher Andon, Portland, OR (US); Matthew Davis, Portland, OR (US); Hien Tommy Pham, Beaverton, OR (US); Jeremy Schroeder, Tigard, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 18/348,203

(22) Filed: Jul. 6, 2023

(65) Prior Publication Data

US 2023/0351489 A1 Nov. 2, 2023

Related U.S. Application Data

(63) Continuation of application No. 17/408,665, filed on Aug. 23, 2021, now Pat. No. 11,727,478, which is a
(Continued)

(51) Int. Cl.
*H04L 9/06* (2006.01)
*G06Q 20/40* (2012.01)
(Continued)

(52) U.S. Cl.
CPC ....... *G06Q 30/0643* (2013.01); *G06Q 20/401* (2013.01); *G06Q 30/0209* (2013.01);
(Continued)

(58) Field of Classification Search
CPC . H04L 9/0866; H04L 9/0643; H04L 2209/38; G06F 16/284; G06F 7/588; G06F 16/2457; G06Q 10/0875
See application file for complete search history.

(56) References Cited

U.S. PATENT DOCUMENTS 11,238,176 B1 2/2022 Vax et al.
2014/0224867 A1* 8/2014 Werner ................ H04W 4/80
235/375
(Continued)

FOREIGN PATENT DOCUMENTS

CN 108647958 A 10/2018
JP 2008097432 A 4/2008
(Continued)

OTHER PUBLICATIONS

James Martin Duffy, How to Code Yo1lr Own CryptoKitties-Style Game on Ethereum, Dec. 4, 2017 (Year: 2017).*

*Primary Examiner* — Mohammed Waliullah
(74) *Attorney, Agent, or Firm* — Quinn IP Law

(57) ABSTRACT

A method of event-based distribution of a cryptographically secured digital asset includes receiving, from a computing device associated with a user, an indication that the computing device is located at a predetermined venue within a predetermined window of time, receiving an indication that a conditional triggering event has occurred during the predetermined window of time, receiving, from the computing device, a unique owner identification (ID) code associated with the user, and transmitting a request to record a transfer of the cryptographically secured digital asset to the user on a distributed blockchain ledger. The request comprises both a unique digital asset ID code and the unique owner ID code, and transmitting the request to record the transfer of the cryptographically secured digital asset on the distributed blockchain ledger occurs only after the indication is received that the conditional event has occurred.

16 Claims, 10 Drawing Sheets

Related U.S. Application Data continuation of application No. 16/707,720, filed on Dec. 9, 2019, now Pat. No. 11,113,754, which is a continuation-in-part of application No. 16/423,671, filed on May 28, 2019, now Pat. No. 10,505,726.

(60) Provisional application No. 62/776,699, filed on Dec. 7, 2018.

(51) Int. Cl.
*G06Q 30/0207* (2023.01)
*G06Q 30/0601* (2023.01)
*H04L 9/00* (2022.01)
*H04W 4/029* (2018.01)

(52) U.S. Cl.
CPC ....... *G06Q 30/0639* (2013.01); *H04L 9/0643* (2013.01); *H04W 4/029* (2018.02); *H04L 9/50* (2022.05)

(56) References Cited

U.S. PATENT DOCUMENTS

| | | | |
|---|---|---|---|
| 2015/0269570 | A1 | 9/2015 | Phan et al. |
| 2018/0294047 | A1* | 10/2018 | Hosseini ................ G16B 50/30 |
| 2019/0141021 | A1* | 5/2019 | Isaacson ............. H04L 63/0807 |
| 2019/0237176 | A1* | 8/2019 | O'brien .................. G16H 20/10 |
| 2020/0074518 | A1 | 3/2020 | Kumaraswamy et al. |
| 2022/0058634 | A1 | 2/2022 | Yantis et al. |

FOREIGN PATENT DOCUMENTS

| | | |
|---|---|---|
| JP | 2016186799 A | 10/2016 |
| JP | 2018506787 A | 3/2018 |
| JP | 2018057457 A | 4/2018 |
| JP | 2019079502 A | 5/2019 |
| JP | 2019145128 A | 8/2019 |
| JP | 2019154055 A | 9/2019 |
| JP | 2019186799 A | 10/2019 |

\* cited by examiner

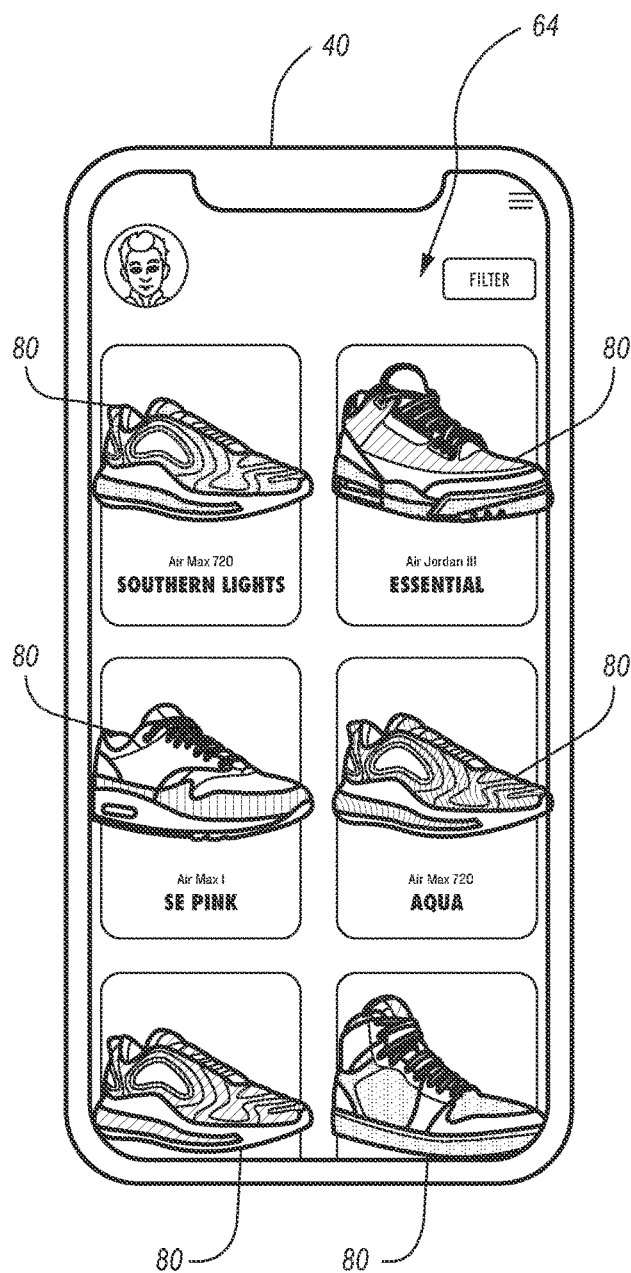
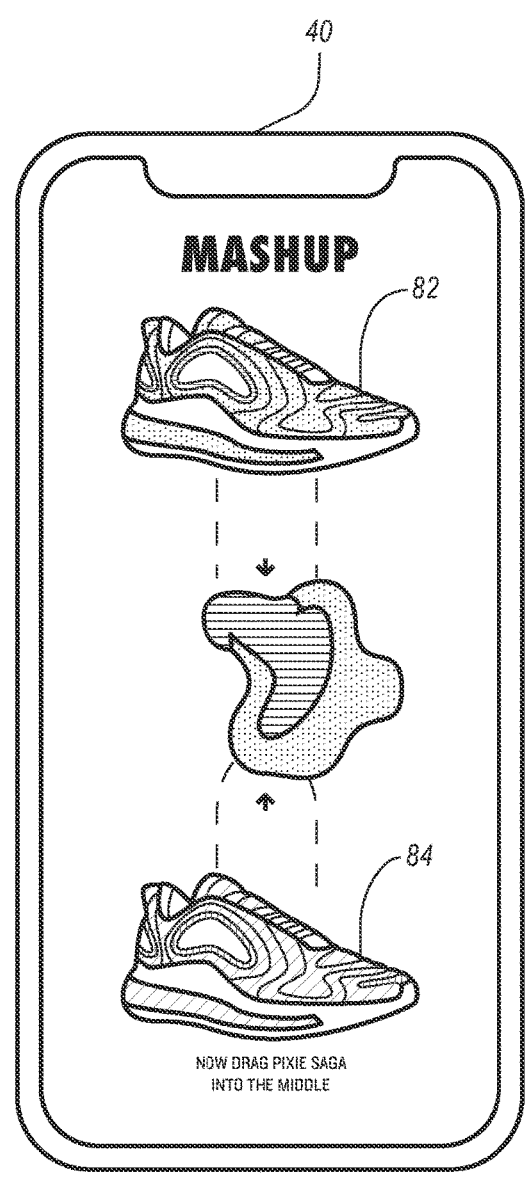
FIG. 5
FIG. 6

EVENT-BASED DISTRIBUTION OF CRYPTOGRAPHICALLY SECURED DIGITAL ASSETS

CROSS REFERENCE TO RELATED APPLICATIONS

The present application is a continuation of U.S. application Ser. No. 17/408,665, filed 23 Aug. 2021 and published as US 2021/0383461, which is a continuation of U.S. application Ser. No. 16/707,720, issued as U.S. Pat. No. 11,113,754 on 7 Sep. 2021, which is a continuation-in-part of U.S. application Ser. No. 16/423,671, issued as U.S. Pat. No. 10,505,726 on 10 Dec. 2019, and which claims the benefit of priority to U.S. Provisional Patent No. 62/776,699, filed on 7 Dec. 2018. Each reference is hereby incorporated by reference in its entirety.

TECHNICAL FIELD

The present disclosure relates generally to a computerized system and method for the creation and distribution of cryptographically secured digital footwear and apparel, as well as decentralized computing systems and blockchain control logic for providing the same.

BACKGROUND

Manufacturers of high-quality footwear have long been plagued by the sale of counterfeit footwear, namely imitation goods that are made with the intent to deceive buyers into believing that they are purchasing the true manufacturer's authentic goods. Similar issues exist within the digital realm, where digital products are often subject to unauthorized sale and reproduction. This unauthorized/counterfeit production and/or digital reproduction can erode a brand's value and/or exclusivity, can negatively affect a company's profitability, and may compromise a user's subjective perception of the product as "collectable."

Market participants and brand enthusiasts in a free market typically assign a higher value to an object if there is limited supply and/or if there is excess demand for that object. While these realities are obvious in the physical real world (particularly to an avid collector), similar market realities also exist within a digital realm.

Within the physical world, many anti-counterfeiting techniques have been developed to help identify counterfeit goods and to prevent illicit sales. Unfortunately, within the digital realm, supply is often unconstrained—if not by the original developer, then by a subsequent party who may freely (or illicitly) duplicate the digital object in its entirety. This often complicates a brand owner's ability to control the exclusivity of a digital object and/or have influence regarding the value of that object. The lack of control over digital object exclusivity then erodes the opportunity for free brand promotion by product enthusiasts and collectors who are in search of that object (as often occurs upon the release of limited production sneakers by "sneakerheads").

With the proliferation of first and third person video games involving customizable skins, apparel, and gear, there exists an opportunity to engage and influence users in the digital realm via collectable objects so that they may be more engaged with a brand in the physical world Likewise, there exists a need for a retailer to more directly influence and/or control the nature and ultimate supply of digital objects within this virtual market.

SUMMARY

Presented herein are cryptographic digital assets for articles of footwear and apparel, methods for provisioning and methods for intermingling such cryptographic digital assets, and decentralized computing systems with attendant blockchain control logic for mining, intermingling, and exchanging blockchain-enabled digital shoes and apparel. More specifically, the presently described technology relies on the trust established in and by blockchain technology to enable a company to control the creation, distribution, expression, and use of digital objects that represent their brand. Unlike typical digital assets that are freely reproducible without loss of content or quality, the use of discrete recordation of ownership via blockchain technology eliminates the ability for simple digital reproductions of the digital objects. In doing so, the company has the ability to control or limit the overall supply of the digital objects (or object trait) and may create controlled scarcity if so desired.

The present disclosure contemplates that, in some examples, the digital object may be representative of: a physical object offered for retail sale; a 2D or 3D design rendering or design file that may be suitable for future production; a virtual representation of an object that is not presently intended for physical creation/production; or other such objects.

To further promote brand engagement and use of the digital object, in some embodiments, the visual expression of the displayed digital object may be altered by the user's use of the object, the user's use of a related retail product or app, or other such measures of object/brand engagement. In some embodiments, the attributes of the digital object and/or its visual expression may affect how the object or user's controlled character performs within a video game context.

By way of example, and not limitation, there are presented cryptographic digital assets that are provisioned through a blockchain ledger of transaction blocks and function, in part, to connect a real-world product, such as a physical shoe, to a virtual collectible, such as a digital shoe. When a consumer buys a genuine pair of shoes—colloquially known as "kicks"—a digital representation of a shoe may be generated, linked with the consumer, and assigned a cryptographic token, where the digital shoe and cryptographic token collectively represent a "CryptoKick". The digital representation may include a computer-generated avatar of the shoe or a limited-edition artist rendition of the shoe. The digital asset may be secured by an encryption-protected block that contains a hash pointer as a link to a related block in a decentralized blockchain, a transaction timestamp, and transaction data. Using the digital asset, the buyer is enabled to securely trade or sell the tangible pair of shoes, trade or sell the digital shoe, store the digital shoe in a cryptocurrency wallet or other digital blockchain locker, intermingle or "breed" the digital shoe with another digital shoe to create "shoe offspring," and, based on rules of acceptable shoe manufacturability, have the newly bred shoe offspring custom made as a new, tangible pair of shoes.

In some embodiments, purchase of an authentic, tangible pair of shoes may enable or "unlock" a corresponding cryptographic digital asset and a digital shoe associated with that digital asset. For example, when a person purchases a real-world pair of shoes from a registered seller, a unique (e.g., 10-bit numeric) physical shoe identification (ID) code of the physical shoes may be linked to a unique (e.g., 42-bit alphanumeric) owner ID code of the buyer. Concomitantly, an access prompt with a unique (e.g., 64-bit numeric) key is issued to a cryptocurrency wallet account associated with the owner ID code such that the buyer can retrieve a digital shoe with a cryptographic token; the key, token and digital shoe are assigned to the owner ID code. For instance, a first Ethereum Request for Comments (ERC) 721 or ERC1155 token may be granted to authenticate and transact a physical shoe, and a second ERC721/ERC1155 token may be granted to access, breed, and transact a digital shoe. For at least some implementations, real-world environmental effects, such as specific types of usage of the physical shoes, may impact the digital representation of the shoes. Respective cryptographic tokens may be assigned to the physical shoes and to the cryptographic digital asset; alternatively, a single cryptographic token may be assigned to both the physical shoes and cryptographic digital asset.

In some embodiments, a digital asset may include genotype information and/or phenotype information for a digital shoe. This genotype/phenotype data may represent certain traits, attributes, colors, styles, backgrounds, etc., of the digital asset, and may be coordinated according to "breeding rules" that govern any intermingling of a digital shoe with one or more other discrete digital shoes. Phenotypic characteristics may depend on genotypic information, and vice versa, along with any one or more of: a virtual environment and attendant effects; time-dependent intermingling restrictions (e.g., cannot breed virtual shoe offspring until both reach a pre-established maturity); virtual user interactions that alter (e.g., speed up or slow down) maturity or increase/decrease a likelihood of certain traits developing; real-world interactions of a user (e.g., running increases number of good/desirable qualities, increases speed of maturity of virtual offspring, etc.); shoe cloning and allowing an owner to set a total number of clones that can be produced from a desirable offspring for actual real-world production. Some optional features may also include: surrogacy features for breeding plans between two or more discrete digital shoes; parenting/nannying features provided by a third-party entity that does not own the digital shoe; behavioral and animated features designed to make a digital shoe appear more life-like (e.g., personalities that change over time); "breeding rights" for a digital shoe may be governed by one or more real-world manufacturing restrictions; ownership rights for each successive generation of a digital shoe may be tied back to the original, real-world shoe (e.g., wholly or partially; by percentage of genotypic contribution, etc.) via encryption key to the originally associated virtual product.

Aspects of this disclosure are directed to methods for provisioning, intermingling, and/or exchanging cryptographic digital assets for footwear. In an example, a method is presented for automating generation of cryptographic digital assets associated with articles of footwear. This representative method includes, in any order and in any combination with any of the above or below disclosed features and options: receiving, via a server-class (middleware or backend) computer over a distributed computing network from a remote computing node (e.g., a point-of-sale (POS) terminal, a personal computer, a smartphone, etc.), a transaction confirmation indicative of a validated transfer of authentic footwear from a first party to a second party; determining, via the middleware server computer from an encrypted relational database, a unique owner ID code (e.g., a member ID of a cryptocurrency wallet or digital locker) associated with the second party; generating a cryptographic digital asset associated with the article of footwear, the cryptographic digital asset including a digital shoe (e.g., a computer-generated avatar) and a unique digital shoe ID code (e.g., a key and cryptographic token); linking, via the middleware server computer, the cryptographic digital asset with the unique owner ID code; and transmitting, via the middleware server computer to a distributed blockchain ledger (e.g., Bitcoin, Ethereum, Litecoin, etc.), the unique digital shoe ID code and the unique owner ID code for recordation on a transaction block.

Other aspects of this disclosure are directed to decentralized computing systems with attendant blockchain control logic for mining, intermingling, and exchanging blockchain-enabled digital shoes. As an example, a decentralized computing system is presented for automating generation of cryptographic digital assets associated with articles of footwear. The decentralized computing system includes a wireless communications device that connects with one or more remote computing nodes over a distributed computing network, and a cryptographic digital asset registry that stores digital shoes and unique digital shoe ID codes associated with multiple cryptographic digital assets. Other peripheral hardware may include a network interface bus, resident and/or remote memory, a user location tracking device, a UPC/UPID scanner, etc.

Continuing with the above example, the decentralized computing system also includes a server-class (middleware or backend) computer that is operatively connected to the wireless communications device and cryptographic digital asset registry. The middleware server computer is programmed to execute memory-stored firmware and software to receive, over the distributed computing network from a remote computing node, an electronic transaction confirmation indicative of a validated transfer of authenticated footwear from one party to another party. Responsive to receipt of the transaction confirmation, the server-class computer retrieves a unique owner ID code of the transferee party from an encrypted relational database, and generates a cryptographic digital asset associated with the article of footwear. The cryptographic digital asset includes a computer-generated digital shoe provisioned through a unique tokenized code with a corresponding access key. The server-class computer then links the cryptographic digital asset to the unique owner ID code in the cryptographic digital asset registry, and transmits the unique digital shoe ID code and unique owner ID code to a distributed blockchain ledger for recordation on a transaction block.

For any of the disclosed systems, methods, digital assets and footwear, the unique digital shoe ID code may include a cryptographic token key with a code string that is segmented into a series of code subsets. A first of these code subsets may include data indicative of attributes of the digital shoe. This attribute data may include genotype and phenotype data for the digital shoe. A second of these code subsets may include data indicative of attributes of the real-world article of footwear, such as colorway, materials, manufacturing, make, sustainability/eco-responsibility, and/or model data, etc., for the article of footwear.

For any of the disclosed systems, methods, digital assets and footwear, the server-class decentralized system computer may respond to receiving a transaction confirmation by transmitting an electronic notification to the second party with information for accessing the cryptographic digital asset. The server-class computer may subsequently receive, from a handheld personal computing device of the second party, a scanning confirmation verifying a universal product code (UPC) and/or a unique product identifier number (UPIN) corresponding to a make and a model of the footwear has been scanned. Linking the cryptographic digital asset with the unique owner ID code may be executed responsive to receipt of the scanning confirmation. In some applications, the unique digital shoe ID code may include a cryptographic token, and the digital notification sent to the second party may include a unique key with a hashed address to the cryptographic token.

For any of the disclosed systems, methods, digital assets and footwear, the server-class computer may receive (from either participating party) a digital breeding solicitation with a request to intermingle the cryptographic digital asset with a third-party cryptographic digital asset. Upon receipt of this solicitation, the server-class computer may responsively generate a progeny cryptographic digital asset with a combination of one or more features from the second-party cryptographic digital asset and one or more features from the third-party cryptographic digital asset. For instance, each cryptographic digital asset may be assigned a respective unique cryptographic token key with a code string that is segmented into a series of code subset. One or more of these code subsets may include data indicative of attributes of the corresponding digital shoe. The progeny cryptographic digital asset is provisioned via a distinct cryptographic token key with a code string composed of one or more code subsets with attribute data extracted from the cryptographic token key of the second-party digital asset and one or more code subsets with attribute data extracted from the cryptographic token key of the third-party digital asset. For instance, one code subset of the progeny digital asset may share a distinct alphanumeric sequence with a code subset of the second-party digital asset, while another code subset of the progeny digital asset may share a distinct alphanumeric sequence with a code subset of the third-party digital asset. Generating the progeny cryptographic digital asset may include applying a random number generator to: designate one of the mating cryptographic digital assets as a sire, designate the other mating cryptographic digital assets as a dam, and determine which code subsets of the progeny will correspond to which code subsets of the sire and which code subsets of the dam.

For any of the disclosed systems, methods, digital assets and footwear, the server-class computer may receive a digital transfer proposal (from either the transferor or the transferee) with a request to transfer the cryptographic digital asset to a third party. The server-class computer may respond by determining a new unique owner ID code of the third party, link the cryptographic digital asset with this new unique owner ID code, and record the transfer of the unique digital shoe ID code to the new unique owner ID code on a new transaction block with the distributed blockchain ledger. The digital transfer proposal may be transmitted in response to a confirmation indicative of a new validated transfer of the article of footwear from the second party to the third party. Alternatively, transfer of the cryptographic digital asset to a third party may be independent of transfer of the physical footwear. Optionally, the server-class computer may generate a smart contract that authenticates ownership of and/or tracks future transaction of the cryptographic digital asset. The unique owner ID code may be linked with a cryptocurrency wallet that registered with the distributed blockchain ledger.

The above summary is not intended to represent every embodiment or every aspect of the present disclosure. Rather, the foregoing summary merely provides an exemplification of some of the concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIG. 5 is an illustration of a representative graphical user interface (GUI) of a personal computing device illustrating a library of a plurality of cryptographic digital assets.

FIG. 6 is an illustration of a representative graphical user interface (GUI) of a personal computing device illustrating a collaboration or breeding event between two cryptographic digital assets.

Figure 1:
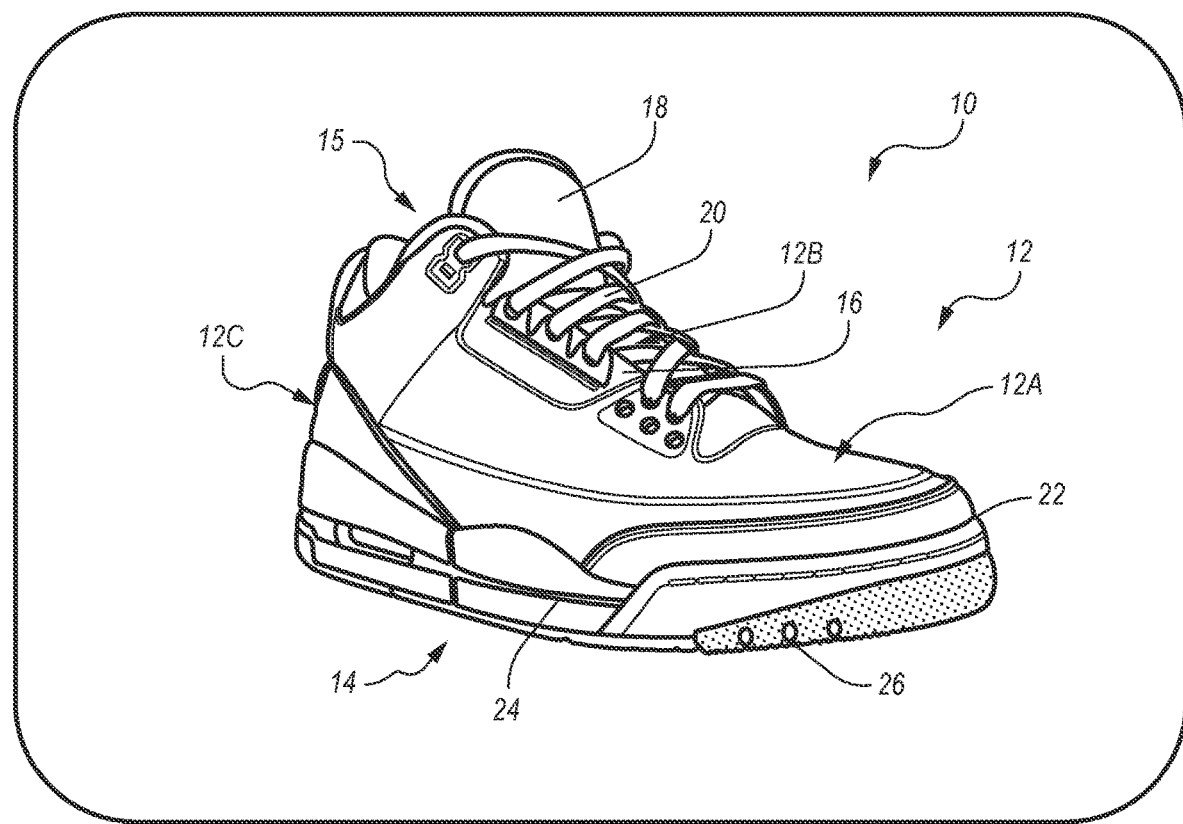
FIG. 1 is a lateral side-view illustration of a representative article of footwear with a collectible digital asset protected by a cryptographic token that is provisioned through a blockchain ledger in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative examples of the disclosure are shown in the drawings and will be described in detail herein with the understanding that these representative examples are provided as an exemplification of the disclosed principles, not limitations of the broad aspects of the disclosure. To that extent, elements and limitations that are described in the Abstract, Technical Field, Background, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "comprising," "having," "containing," and the like shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, medial, lateral, proximal, distal, vertical, horizontal, front, back, left, right, etc., may be with respect to an article of footwear when worn on a user's foot and operatively oriented with a ground-engaging portion of the sole structure seated on a flat surface, for example.

Aspects of this disclosure are directed to computer-generated digital/virtual collectibles, such as digital shoes (e.g., "CryptoKicks"), that, in some instances, the digital asset may be secured and/or uniquely identified by a cryptographic token and may be linked and/or distributed with real-world, physical products, such as tangible shoes. In other embodiments, instead of being linked or distributed with real-world, physical products, the digital asset may be linked or distributed with a 2D or 3D design file such as a CAD model, graphical rendering, image, or drawing package from which a physical product may be constructed or otherwise represented.

In some embodiments, various digital assets may be used by a company to stay apprised of consumer trends and preferences. For example, a company may create a number of product-ready designs with different traits, silhouettes, colors, and the like, and may distribute them across one or more digital platforms as digital assets, and may then monitor the popularity, value, demand, and/or virtual use, of different product designs and/or traits. In doing so, the company may gain a valuable understanding of the real-time demand for a product, which may be helpful when prioritizing of designs for future manufacturing.

In some embodiments, a digital asset or attribute modifier may be created for brand promotion purposes. For example, a digital shoe may be created in a preset and/or controlled limited quantity and distributed as part of a promotion, event, moment, or contest. Spectators at a professional sporting event (e.g., a home opener) may be given the right to acquire one of a limited quantity of unique digital assets, each being separately secured via its own cryptographic token.

As used herein, "cryptographic digital assets," or simply "digital assets" may refer to any computer-generated virtual object, including digital footwear, apparel, headgear, avatars, pets, etc., that have a unique, non-fungible tokenized code ("token") registered on and validated by a blockchain platform or otherwise registered in an immutable database. Furthermore all references to "CryptoKicks" and variations of the term within this disclosure should be understood to be exemplary of a virtual collectible backed by a unique, non-fungable token or registry entry within an immutable database. It should not be limiting to only footwear. All such references should be read to equally apply to apparel (e.g., "CryptoThreads"), headgear (e.g., "CryptoLids"), and sporting equipment (e.g., "CryptoGear"), or other such objects.

In some embodiments, the virtual object may have a plurality of attributes (i.e., phenotypic traits) that are at least partially derived from an encrypted alphanumeric string that may be associated with the cryptographic token. In this sense, the alphanumeric string may be akin to the genetic code of the virtual object. (i.e., genotypic information is the underlying code/code segments while phenotypic traits are the expression of the genotypic information). While the phenotypic traits may depend on the encoded genotypic information, in some embodiments, they may further depend on any one or more of: a virtual environment (e.g., virtual check-ins, situation-specific criterion, etc.); time-dependent breeding (e.g., a user is restricted from breeding a virtual shoe offspring until it reaches a preset maturity); virtual user interactions, which may speed up or slow down maturity or increase/decrease a likelihood of certain traits developing; real-world user activities (e.g., user's level of physical activity may increase one or more "desirable" qualities; daily use of a related good speeds up maturing of virtual offspring, etc.); cloning restrictions set by manufacturer, point of sale, owner, etc., (e.g., preset maximum number of clones that can be produced from a desirable offspring for actual real-world production).

In a footwear context, each unique token may be directly linked to a single CryptoKick object, which may be embodied as a virtual reproduction or digital-art version of a sneaker. In one embodiment, the token may include a 64-bit alphanumeric code that is sectioned into individual code segments. One or more or all of the code segments of the alphanumeric code may express data indicative of attributes of the collectible digital shoe. For instance, a series of code segments may provide digital shoe attributes, such as Style, Materials, Family, Heat, Colorway, Future Attributes, Make, Model, Pattern Scheme, Image Background, etc. Each subset of a code may generally function as a genotype that produces a visual phenotype expression to the user. In some embodiments, an originally created CryptoKick may include cryptographic token data that is representative of attributes from a companion physical shoe. During the creation of a CryptoKick, a smart contract may be generated to authenticate ownership and to track future transaction of the CryptoKick. Digital shoe attributes may also be linked to a bill of materials.

In a representative example, an authenticated pair of physical shoes are created and assigned a Unique Product Identifier (UPID). Upon purchase by a consumer, the UPID is used to unlock a cryptographic digital asset—a "CryptoKick"—composed of a collectible digital shoe and a unique non-fungible token (NFT) operating on a blockchain-based distributed computing platform.

In general, before a consumer can unlock or acquire a CryptoKick, they may first be required to procure a blockchain locker address (e.g., an Ethereum hardware wallet). This blockchain locker may be used to store the private key belonging to the CryptoKick's NFT and, optionally, may be linked to a personal user account that is registered with the original manufacturer of the physical shoes (e.g., a NIKE-PLUS® account profile).

It is envisioned that there are several ways in which a user may be enabled to unlock a CryptoKick. As a first example, upon scanning the shoe's UPC or UPID at a point-of-sale (POS) terminal during first purchase or directly associated with the product, a unique crypto-token and corresponding private key ("KickID") are automatically generated and assigned to the user's blockchain locker (see FIG. 7). In a second example, a KickID is provided to the user via a printed or digital receipt, a visual or electronic tag (RFID or NFC) hidden in the physical shoe, a pop-up message or email sent to a personal user account, a push notification or text message sent to a smartphone, or some other record; the consumer uses the KickID to link the CryptoKick to their digital blockchain locker. Another example may require the user to assemble the KickID in part via a physical code or UPID associated with the shoe (on the box, on a hang tag, under a label, on an insole, etc.), and in part via a transaction authentication code (i.e., to prevent consumers from collecting a CryptoKick when they merely try on a pair of shoes). Another example may require the user to "hunt" for CryptoKicks in a brick-and-mortar store by using a photographic "snap" or augmented reality ("AR") function on a handheld personal computing device. For this method, a KickID may be provided via the validated transaction, however, the user must separately find a hidden CryptoKick in AR hidden within the store or local area before the digital asset can be transferred to their locker (i.e., the cryptographic key and the virtual object must both be separately acquired before the transfer occurs). In this example, obtaining the cryptographic key may enable the AR engine associated with a user device to initiate a game where the CryptoKick/virtual object associated with that key is locally hidden and available for the user to locate.

Figure 8:
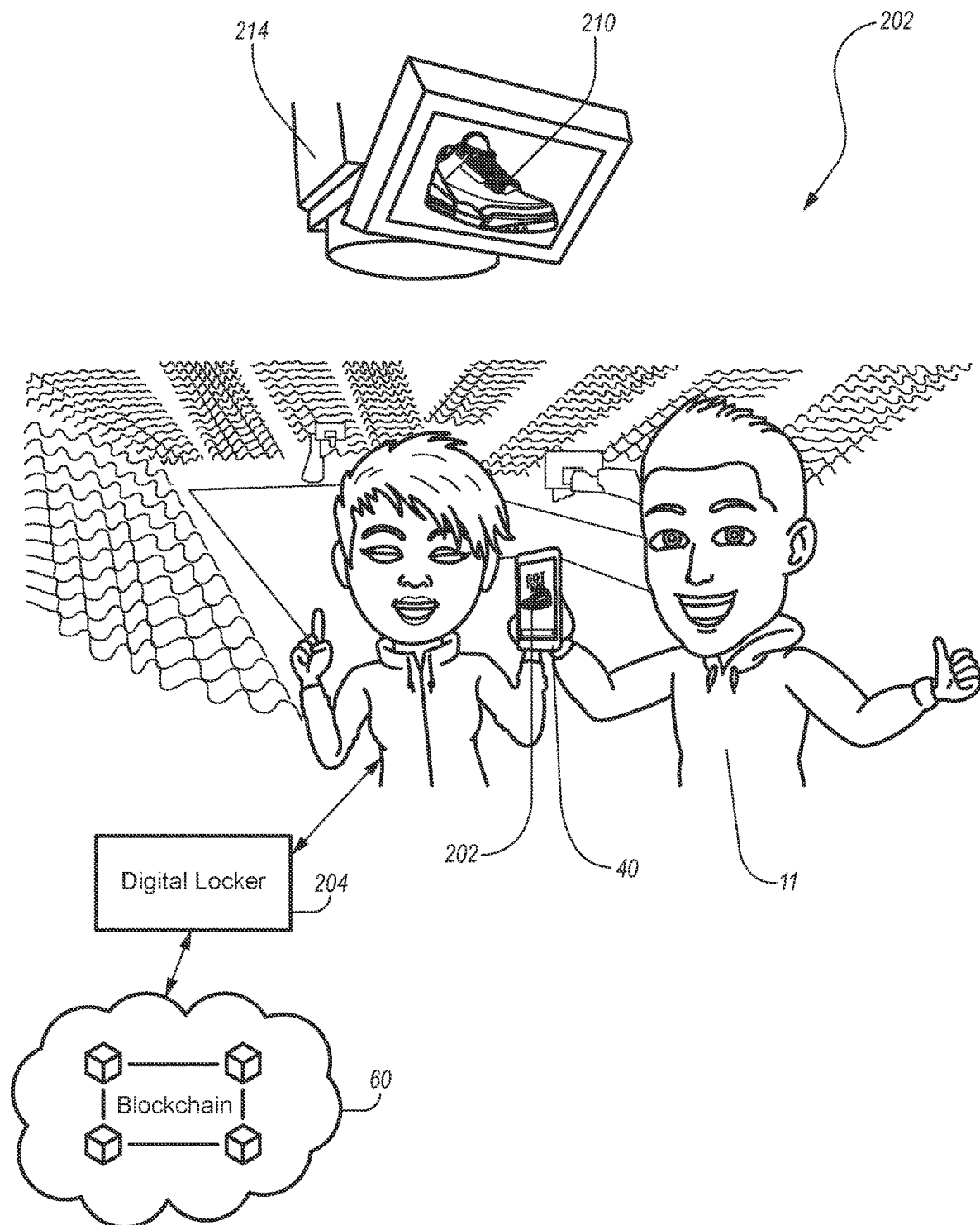
FIG. 8 is a functional illustration of the acquisition of a cryptographic digital asset via a promotional giveaway at an event.

In some instances, the CryptoKick may not be originally linked to a physical product, but instead may be gifted to the user as part of a brand promotion campaign, event, moment, or experience. In one example, such as generally illustrated in FIG. 8, a user at a sporting event may be required to hunt for the CryptoKick within the confines of the event using the camera on a smartphone device. In this embodiment, the GPS associated with the smartphone device may further constrain optical recognition capabilities to within a particular geofenced area. Once the CryptoKick is located (e.g., virtually disguised in a billboard advertisement), the user may be prompted to scan a unique code, such as the barcode on their ticket to the event. This two-part action may then transfer a token uniquely provisioned for that ticket to the user's locker. Following the event, the promotion organizer may reclaim any unclaimed KickIDs for subsequent use in other promotional events. In still other embodiments, a user may unlock a KickID upon the receipt of a digital design file or image. For example, in an online promotion, certain users may be selected (in an ordered or random manner) to receive an image, design file, or graphical rendering. A predetermined number of "winning images" may be displayed and/or transferred to a user's computing device for subsequent display, where each is associated with a different and unique KickID that may be used to facilitate the transfer of the CryptoKick to a private locked associated with the user. In some embodiments, the "winning image" may represent the purchase or successful agreement to purchase a particular physical or digital object. In other embodiments, the "winning image" may simply be a hidden or masked imaged within an online brand promotion page that requires user interaction to unmask.

After acquiring a CryptoKick, the owner may buy, sell, intermingle, collect, or trade CryptoKicks, e.g., using physical, fiat, and/or digital currency. In some examples, an entity may maintain a digital online marketplace that includes an inventory of CryptoKicks for sale and/or a marketplace that may broker transactions between individuals.

In one embodiment, it may be possible to breed or mashup ("Collab") two CryptoKicks to create an offspring CryptoKick (an "RVK" or "CollaboKick"). This CollaboKick will have a unique token and distinct attributes compared to the parent CryptoKicks. A Collab may combine attribute data and/or genetic code from the two tokens of the parents to generate a new NFT or KickID that, in turn, provisions a CollaboKick. In some implementations, there may be a pre-established limitation on the total number of Collab events within a given time limit, e.g., to help prevent overproduction of CollaboKicks between the same two users. The creation of the genetic code for a CollaboKick may be random, systematic, regulated, unconstrained, or any combination thereof. One or more code subsets, for example, may be based on controlled probability using Mendel's Law. For example, if a first attribute code (e.g., molding heat) is expressed as two genes (e.g., HH, Hh or hh), a CollaboKick is considered to have "high heat" if it has two genes that are "hh" (recessive trait). In other words, if genotype data contained in the KickIDs of the CryptoKick parents have Hh as their "heat genes," the offspring CollaboKick will have a 25% of getting a high heat gene, e.g., using the Punnett square methodology.

The option to execute a Collab event may require one or both owners comply with one or more prerequisite conditions. As one example, the two owners of the parent CryptoKicks may be required to meet at a designated location or be within a predetermined proximity of one another to create a CollaboKick. For example, a user may employ a "CryptoKick Collab" matching feature on a dedicated mobile software application ("app") to find another user to Collab with. Using this app, the parties may set a time and place to meet, set the conditions of the Collab, submit a formal request to a governing middleware computing node, etc. Another example may include the footwear manufacturer or a third-party sponsor host a Collab event at which CryptoKick owners meet at a designated location to Collab with one another within a specific time frame.

In some embodiments, owners may be provided some indication of the genetic traits of their CryptoKicks to facilitate more deliberate Collab events. In an example, a user may desire a CryptoKick of a particular model in a certain exclusive color. That user may then search out a CryptoKick that has the genetic code for that color and attempt to Collab with them. To further the understanding of a trait's value, in some embodiments, the user may be provided with an indication of the rarity or total circulating supply of each trait that makes up their CryptoKick and/or a rarity score that provides an indication of the overall exclusivity of their CryptoKick. In this manner, if offered for sale on a commercial marketplace, a CryptoKick may carry an intrinsic value that reflects the combined rarity or exclusivity of its various traits.

A predetermined set of intermingling rules may govern if and how a Collab may be executed. For example, certain constraints may be imposed so that broad style guidelines are maintained in the CollaboKick. In one embodiment, these style constrains may be the same constraints or guidelines that a company may use when creating new versions, colorways, or iterations of an existing product line. When a Collab is created, the genetic mixing algorithm may be constrained such that any resultant Collab kick maintains a likeness or silhouette that is indicative of or more existing products. While in one embodiment, these style guidelines or rules may expressly set by the company, in another embodiment, they may be discovered and assembled, for example, using an image-based processing algorithm that may recognize style attributes (e.g., color patterns, material, cut, and/or dimensional patterns) from existing product.

For at least some implementations, a CryptoKick may be programmed to function as a "living" digital pet that the user feeds, cleans, entertains and otherwise cares for to ensure the pet is happy and healthy. Optionally, an owner can either care for the CryptoKick pet by him/herself or have a third-party user care for the CryptoKick pet. As the CryptoKick pet evolves—growing from a baby digital pet to a toddler, then preschooler, and so forth to adulthood—one or more attributes of the CryptoKick automatically change with age or are unlocked over time. Furthermore, as the CryptoKick pet "grows" through various life stages, it may unlock a real-life shoe version of itself that a user can have made. For example, if a CryptoKick pet has evolved into a royal blue athletic shoe for a toddler, the user has unlocked the option to buy a special royal blue athletic shoe in one or more toddler sizes.

In some implementations, a user's CryptoKick may be capable of being imported into one or more other digital platforms to serve, for example, as a skin on a video game character that may be developed and/or controlled by the user. For example, if the user was active in a certain basketball video game, the CryptoKick could be imported to that game and worn by the user's player or team.

If the CryptoKick is imported into a separate video game, in some configurations, different attributes of the CryptoKick may impart changes in the ability level of a user's character outfitted with the asset. In one example, the attributes of the user's character may be positively influenced by the rarity or exclusivity of the various attributes or by the overall combined rarity or exclusivity of the asset. For example, a rare CryptoKick may impart better jumping ability or lateral quickness, a rare CryptoThread may impart better strength or speed, and a rare CryptoLid may impart better vision.

In some embodiments, CryptoKicks users may decide on a "best CollaboKick" in the marketplace, e.g., on a W/M/Q/Y basis. Such a voting scheme may be used to designate one or more CollaboKicks as suitable for the commercial production of physical product bearing that digital asset's likeness. As a further option, a CollaboKick that may receive a preset threshold number of upvotes may automatically trigger the manufacturer to produce the CollaboKick in real life.

As CryptoKicks and CollaboKicks are transferred between users over time due to selling, trading, buying, and Collab, each transaction history may be tracked within a blockchain ledger of transactions. If a CollaboKick or CryptoKick is fabricated, previous users may be notified of such real-life existence and will may be given an option to purchase their own real-life pair of the CollaboKick/CryptoKick.

As a further extension, in one embodiment, CryptoKicks may be backed by fungible tokens, where the digital collectible represents a monetary value. In one implementation, certain attributes within the code assigned to the token may dictate the worth. For example, a style attribute indicative of a high-top sneaker, may have a first value, a style attribute indicative of yoga pants may have a second value, and a style attribute indicative of a running shirt may have a third value. In one embodiment, these values may either be allowed to float according to market forces, or may be tied to a fiat currency.

Referring now to the drawings, wherein like reference numbers refer to like features throughout the several views, there is shown in FIG. 1 a representative article of footwear, which is designated generally at 10 and portrayed herein for purposes of discussion as an athletic shoe or "sneaker." The illustrated article of footwear 10—also referred to herein as "footwear" or "shoe" for brevity—is merely an exemplary application with which novel aspects and features of this disclosure may be practiced. In one embodiment, the illustrated article of footwear 10 may be or resemble a CryptoKick. In the same vein, implementation of the present concepts for a digital shoe and cryptographic token for footwear should also be appreciated as a representative implementation of the disclosed concepts. It will therefore be understood that aspects and features of this disclosure may be utilized for other types of footwear, and may be incorporated into any logically relevant consumer product. As used herein, the terms "shoe" and "footwear," including permutations thereof, may be used interchangeably and synonymously to reference any suitable type of garment worn on a human foot. Lastly, features presented in the drawings are not necessarily to scale and are provided purely for instructional purposes. Thus, the specific and relative dimensions shown in the drawings are not to be construed as limiting.

The representative article of footwear 10 is generally depicted in FIG. 1 as a bipartite construction that is primarily composed of a foot-receiving upper 12 mounted on top of a subjacent sole structure 14. While only a single shoe 10 for a left foot of a user is shown in FIG. 1, a mirrored, substantially identical counterpart for a right foot of a user may be provided. Recognizably, the shape, size, material composition, and method of manufacture of the shoe 10 may be varied, singly or collectively, to accommodate practically any conventional or nonconventional footwear application.

With continued reference to FIG. 1, the upper 12 is depicted as having a shell-like, closed toe and heel configuration for encasing a human foot. Upper 12 of FIG. 1 is generally defined by three adjoining sections, namely a toe box 12A, a vamp 12B and a rear quarter 12C. The toe box 12A is shown as a rounded forward tip of the upper 12 that extends from distal to proximal phalanges to cover and protect the user's toes. By comparison, the vamp 12B is an arched midsection of the upper 12 that is located aft of the toe box 12A and extends from the metatarsals to the cuboid. As shown, the vamp 12B also provides a series of lace eyelets 16 and a shoe tongue 18. Positioned aft of the vamp 12B is a rear quarter 12C that extends from the transverse tarsal joint to the calcaneus bone, and includes the rear portions of the upper 12. While portrayed in the drawings as comprising three primary segments, the upper 12 may be fabricated as a single-piece construction or may be composed of any number of segments, including a toe cap, heel cap, ankle cuff, interior liner, etc. For sandal and slipper applications, the upper 12 may take on an open toe or open heel configuration, or may be replaced with a single strap or multiple interconnected straps.

The upper 12 portion of the footwear 10 may be fabricated from any one or combination of a variety of materials, such as textiles, engineered foams, polymers, natural and synthetic leathers, etc. Individual segments of the upper 12, once cut to shape and size, may be stitched, adhesively bonded, fastened, welded or otherwise joined together to form an interior void for comfortably receiving a foot. The individual material elements of the upper 12 may be selected and located with respect to the footwear 10 in order to impart desired properties of durability, air-permeability, wear-resistance, flexibility, appearance, and comfort, for example. An ankle opening 15 in the rear quarter 12C of the upper 12 provides access to the interior of the shoe 10. A shoelace 20, strap, buckle, or other conventional mechanism may be utilized to modify the girth of the upper 12 to more securely retain the foot within the interior of the shoe 10 as well as to facilitate entry and removal of the foot from the upper 12. Shoelace 20 may be threaded through a series of eyelets 16 in or attached to the upper 12; the tongue 18 may extend between the lace 20 and the interior void of the upper 12.

Sole structure 14 is rigidly secured to the upper 12 such that the sole structure 14 extends between the upper 12 and a support surface upon which a user would stand. The sole structure 14 may be fabricated as a sandwich structure with a top-most insole 22, an intermediate midsole 24, and a bottom-most outsole 26 or outsole surface. Alternative sole configurations may be fabricated with greater or fewer than three layers. Insole 22 is shown located partially within the interior void of the footwear 10, operatively attached at a lower portion of the upper 12, such that the insole 22 abuts a plantar surface of the foot. Underneath the insole 22 is a midsole 24 that incorporates one or more materials or embedded elements that enhance the comfort, performance, and/or ground-reaction-force attenuation properties of footwear 10. These elements and materials may include, individually or in any combination, a polymer foam material, such as polyurethane or ethylvinylacetate (EVA), filler materials, moderators, air-filled bladders, plates, lasting elements, or motion control members. Outsole 26 is located underneath the midsole 24, defining some or all of the bottom-most, ground-engaging portion of the footwear 10. The outsole 26 may be formed from a natural or synthetic rubber material that provides a durable and wear-resistant surface for contacting the ground. In addition, the outsole 26 may be contoured and textured to enhance the traction (i.e., friction) properties between footwear 10 and the underlying support surface.

As a general matter, each element, panel, section, and material of the article of footwear 10 shown in FIG. 1 may be separately rendered or defined in a digital CryptoKick. Furthermore, these attributes may similarly be reflected within the genetic code of the NFT, as discussed above.

Figure 2:
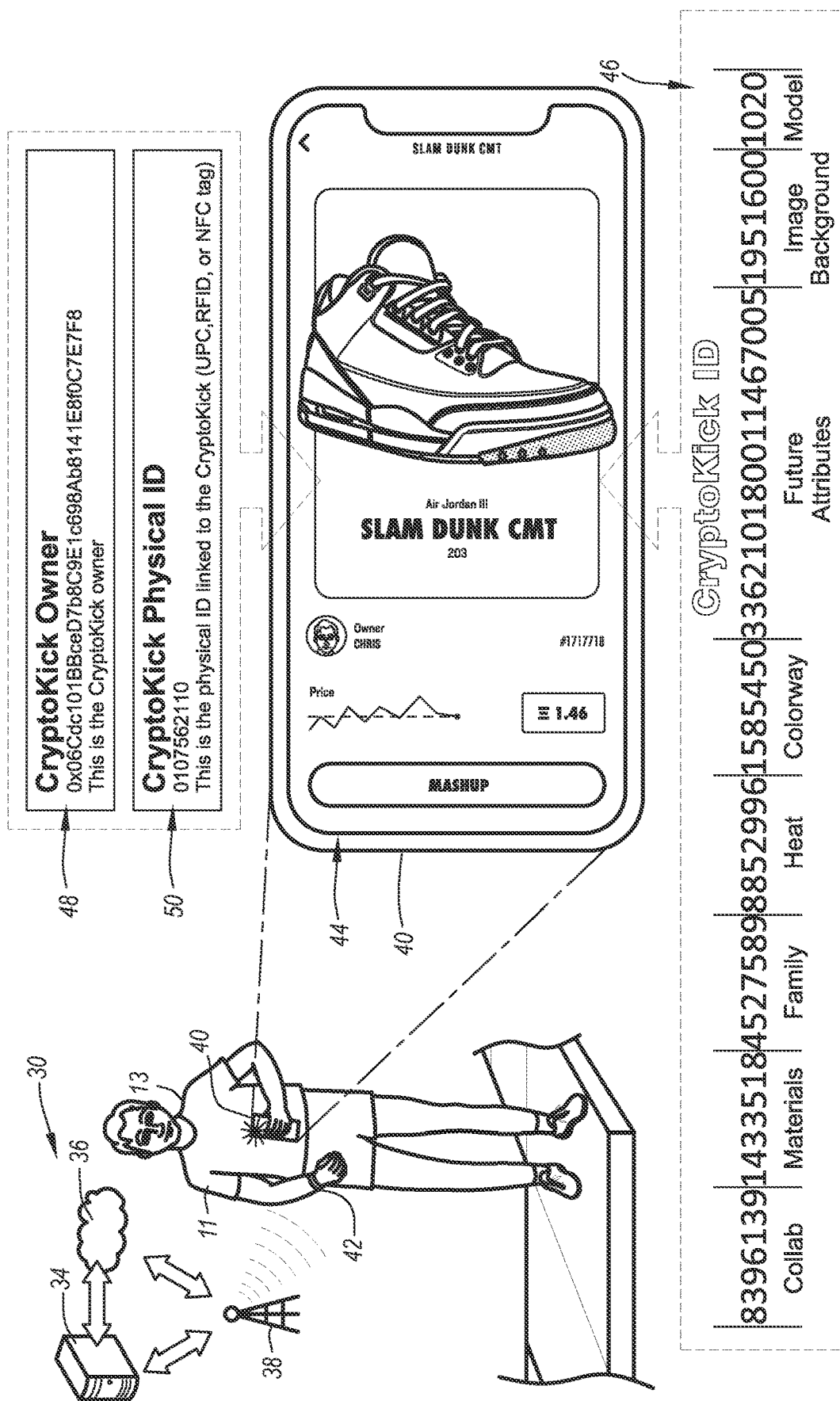
FIG. 2 is a diagrammatic illustration of a representative decentralized computing system for mining, intermingling, and exchanging cryptographic digital assets in accordance with aspects of the present disclosure.

FIG. 2 is a diagrammatic illustration of an exemplary decentralized computing system, designated generally as 30, with attendant blockchain control logic for mining, intermingling, and exchanging blockchain-enabled digital collectibles. User 11 communicatively couples to a remote host system 34 and/or a cloud computing system 36 via a wireless communications network 38. While illustrating a single user 11 communicating over the decentralized computing system 30 with a single host system 34 and a single cloud computing system 36, it is envisioned that any number of users may communicate with any number of remote computing nodes that are suitably equipped for wirelessly exchanging information and data. Wireless data exchanges between the user 11 and remote computing nodes on the decentralized computing system 30 may be conducted directly, e.g., through direct communications between the host system 34/cloud computing system 36 and a user device 39 (e.g., the user's smartphone 40, smartwatch 42, or other suitable personal computing device), or indirectly, e.g., with all communications between the user 11 and other computing nodes being routed through the host system 34. Only select components of the decentralized computing 10 and decentralized computing system 30 are shown and will be described in detail herein. Nevertheless, the systems and devices discussed herein can include numerous additional and alternative features, and other available hardware and well-known peripheral components, for example, for carrying out the various methods and functions disclosed herein. While the described system relies on a blockchain ledger and process for recording ownership of the digital asset, it should be understood that the present technology may operate on a public chain or a private chain, and may utilize one or more forms of cryptography, encoding, proof of work challenges, or other concepts and technologies involved in available blockchain standards or suitable alternative immutable databases/ledgers.

With continuing reference to FIG. 2, the host system 34 may be implemented as a high-speed server computing device or a mainframe computer capable of handling bulk data processing, resource planning, and transaction processing. For instance, the host system 34 may operate as middleware in a client-server interface for conducting any necessary data exchanges and communications with one or more "third party" servers to complete a particular transaction. The cloud computing system 36, on the other hand, may operate as middleware for IoT (Internet of Things), WoT (Web of Things), Internet of Adaptive Apparel and Footwear (IoAAF), and/or M2M (machine-to-machine) services, connecting an assortment of heterogeneous electronic devices with a service-oriented architecture (SOA) via a data network. As an example, cloud computing system 36 may be implemented as a middleware node to provide different functions for dynamically onboarding heterogeneous devices, multiplexing data from each of these devices, and routing the data through reconfigurable processing logic for processing and transmission to one or more destination applications. Network 38 may be any available type of network, including a combination of public distributed computing networks (e.g., Internet) and secured private networks (e.g., local area network, wide area network, virtual private network). It may also include wireless and wireline transmission systems (e.g., satellite, cellular network, terrestrial networks, etc.). Most if not all data transaction functions carried out by the user 11 may be conducted, for example, over a wireless network, such as a wireless local area network (WLAN) or cellular data network.

As a decentralized blockchain platform, computing system 30 operates as an open, yet encrypted peer-to-peer network in which asset transaction records—known as "blocks"—are linked via cryptographic hash functions in a distributed, immutable ledger of interconnected blocks, i.e., a "blockchain." Each block in the chain includes one or more digital asset transactions accompanied by corroboration information representing a validity of each transaction as assessed by peer-validation devices. Encrypted, decentralized computing architectures allow for identity verification and authentication of transacted assets while preventing duplication of a cryptography-protected ("cryptographic") digital asset registered to the platform. Decentralized asset management may work by encrypting a proprietary asset file, breaking the encrypted code into tiny "nonsense" shards, and sending these shards to numerous different computing nodes on the decentralized computing network. A validated owner is provided with a private key that indicates where in the network the asset is located and how to reassemble or "decrypt" the file. For use as a distributed ledger, an individual blockchain is typically managed by a host administrator and distributed to multiple peers collectively adhering to a protocol for inter-node communication and block validation.

One should appreciate that the disclosed systems and techniques provide many advantageous technical effects including construction and storage of a digital asset blockchain representing user-to-user transactions of virtual collectibles. Further the blockchain technology enables the creation of unique, yet fully transferrable digital assets that maintain value by way of the general inability to make lossless copies (unlike traditional, unsecured digital files).

Figure 3:
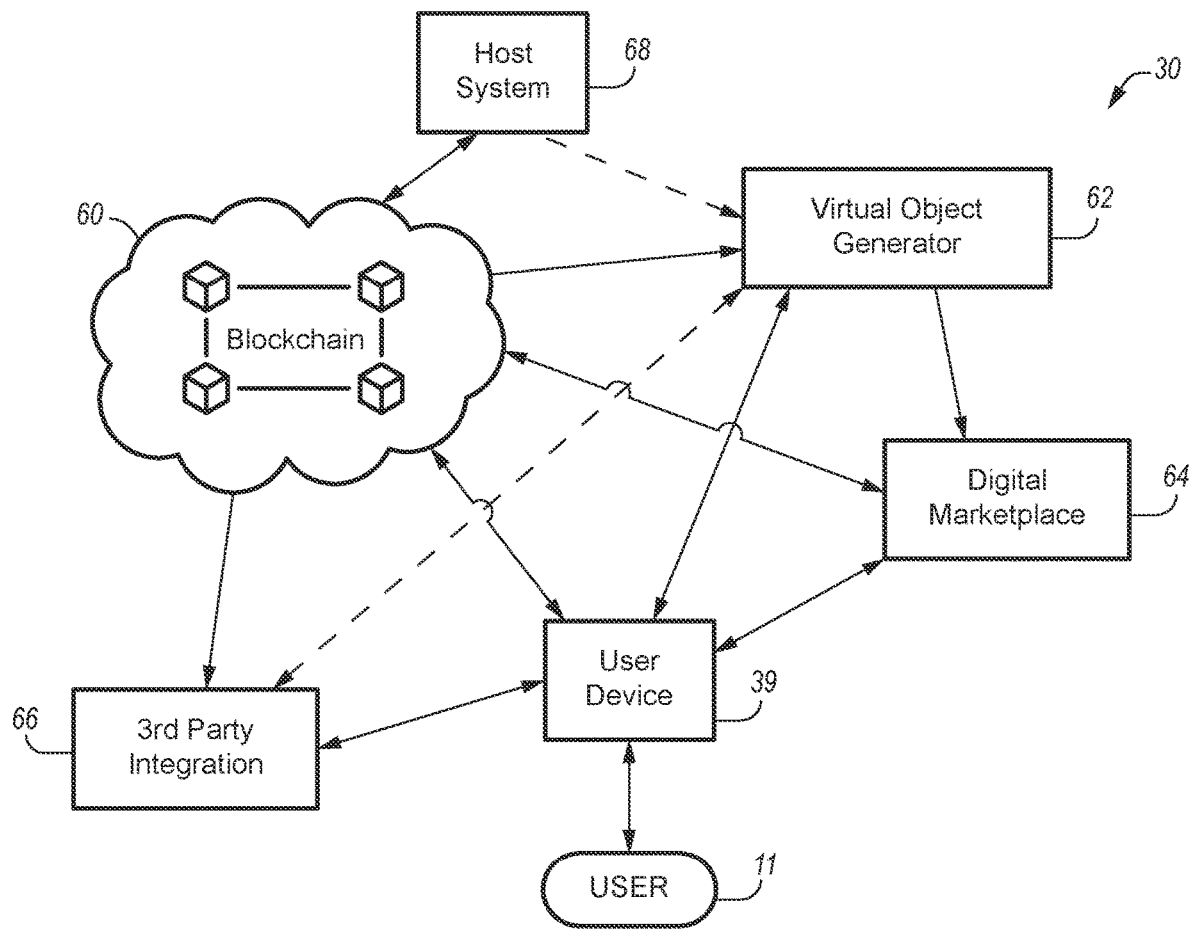
FIG. 3 is a diagrammatic illustration of the functional structure of a decentralized computing system for mining, intermingling, and exchanging cryptographic digital assets in accordance with aspects of the present disclosure.

FIG. 3 provides one example of the functional structure of a decentralized computing system 30, such as shown in FIG. 2. As generally illustrated, a user 11 may operatively interface with a user device 39 (i.e., interface device 39) that may include one or more of a smart phone 40, a tablet computer, a smart watch 42, a laptop computer, a desktop computer, a standalone video game console, smart footwear/apparel, or other similar internet enabled devices. The interface device 39 may be operatively configured to communicate with one or more of an immutable public database (e.g., a blockchain service/network 60—referred to as "blockchain 60"), a virtual object generator 62, an online digital marketplace 64, and/or a $3^{rd}$ party integration service 66.

In general, the blockchain 60 may include at least one non-fungible token registered thereon that includes genomic information representative of a digital asset. The user 11, via the user device 39, may be in possession of, or may be lined with a locker/wallet that includes a private cryptographic key that permits the user device to read the encrypted data associated with the token. This key may further enable the user 11 to freely transfer ownership of the token.

In one embodiment, a virtual object generator 62 may be provided to create a digital object on the basis of the genomic information associated with the token. More specifically, the virtual object generator 62 may be responsible for expressing the genomic information into a plurality of phenotypic traits. The virtual object generator 62 may employ a plurality of style and artistic rules such that the resultant digital objects are unique, yet recognizable according to predefined silhouettes, styles, articles, or characters. In some embodiments, the virtual object generator 62 may further operate on the basis of other non-genomic factors, such as the age of the asset, user activity (tracked via the user device), or use via third party platforms. In such an embodiment, these non-genomic inputs may alter the phenotypic expression, and/or may unlock new abilities, breeding rights, and/or production rights. For example, in one configuration, a color of a CryptoKick may depend on the genetically assigned color, together with the age of the asset and/or use of the asset in a virtual world or via a linked pair of physical shoes in the real world. The initial color together with the age/experience based alteration may result in a new color that has its own relative rarity score/value.

The virtual object generator 62 and/or blockchain 60 may further be in communication with a hosted digital marketplace 64, forum, social platform, or the like (such as generally shown in FIG. 5—displayed on a smartphone 40). The digital marketplace 64 may represent a plurality of virtual objects 80 in such a manner that permits the organized trade or sale/purchase of the virtual objects between parties. Upon the closing of a sale, the digital marketplace 64 may update the blockchain 60 with the new ownership information and facilitate the transfer of new of existing keys to the new asset holder. In some embodiments, the marketplace 64 may further enable various social engagement functions, such as voting or commenting on the represented virtual objects Likewise, in some instances the marketplace 64 may be configured to assess and score the rarity of a particular virtual object based on the sum total of the object's expressed traits. Such a rarity score may then enable the marketplace (and/or users who participate within the marketplace) to better assess the value of the object.

In one configuration, the computing system 30 may further include a $3^{rd}$ party integration service 66 that may enable the use of the virtual object in different contexts or manners. The $3^{rd}$ party integration service 66 may operate as an API on an app provided on the user's device, or as a dedicated cloud based service. In some embodiments, the $3^{rd}$ party integration service 66 may make the virtual object (for example, as expressed by the virtual object generator 62), and/or the genomic information available for external use. Examples of such a use may include skins on $3^{rd}$ party video game characters, objects capable of being used by $3^{rd}$ party video game characters (see FIG. 9), digital artwork displays, physical print generation, manufacturing production, and the like. In one embodiment, the genomic information and/or rarity score may be made available, and may alter the traits or abilities of a user's video game character in a video game played on the user's device 39 (see FIG. 10).

As further shown in FIG. 3, in one configuration, a corporate host system 68 may be in communication with the blockchain 60 for the purpose of provisioning and/or initially creating new digital assets. Additionally, the host system 68 may provide one or more rules to the virtual object generator 62 to constrain the manner and style in which genomic information from the blockchain 60 is expressed in a visual/artistic form.

Figure 4:
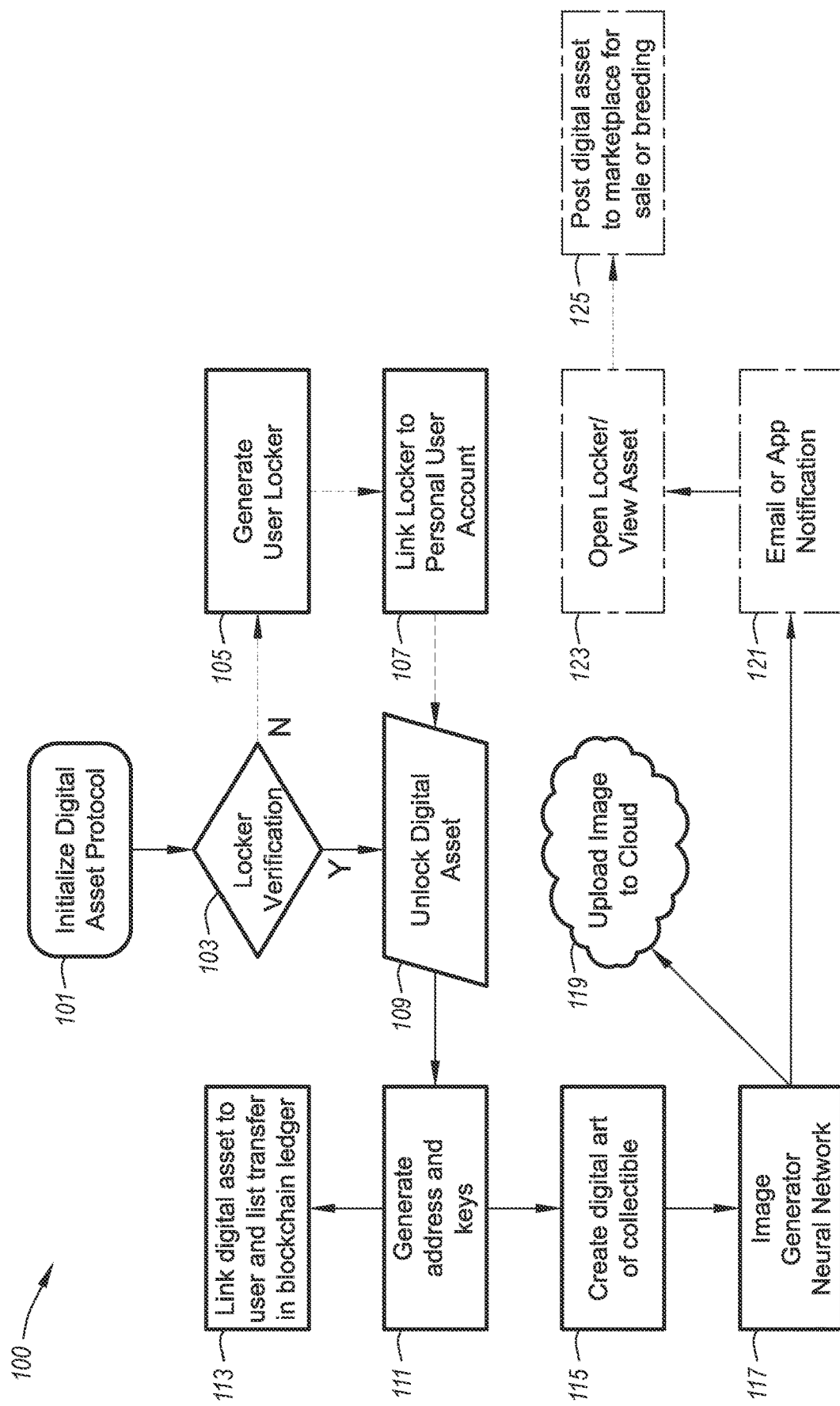
FIG. 4 is a flowchart illustrating a representative workflow algorithm for generating collectible digital shoes protected by cryptographic tokens on a blockchain ledger, which may correspond to memory-stored instructions executed by control-logic circuitry, programmable electronic control unit, or other computer-based device or network of devices in accord with aspects of the disclosed concepts.

With reference now to the flow chart of FIG. 4, an improved method or control strategy for generating collectible digital assets protected by cryptographic tokens on a blockchain ledger is generally described at 100 in accordance with aspects of the present disclosure. Some or all of the operations illustrated in FIG. 4 and described in further detail below may be representative of an algorithm that corresponds to processor-executable instructions that may be stored, for example, in main or auxiliary or remote memory, and executed, for example, by a resident or remote controller, central processing unit (CPU), control logic circuit, or other module or device or network of devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at terminal block 101 with processor-executable instructions for a programmable controller or control module or similarly suitable processor to call up an initialization procedure for a protocol to generate a cryptographic digital asset, such as computer-generated digital shoe 44 and encrypted token key 46 of FIG. 2, for a consumer product, such as sneaker 10 of FIGS. 1 and 2. This routine may be called-up and executed in real-time, continuously, systematically, sporadically, and/or at regular intervals. As a representative implementation of the methodology set forth in FIG. 4, the initialization procedure at block 101 may automatically commence each time a pair of authentic footwear 10 is manufactured, each time a user 11 purchases a real-world pair of the footwear 10, or each time the user 11 unlocks the access key 46. Alternatively, the initialization procedure may be manually activated by an employee at a POS terminal or by the manufacturer.

Utilizing a portable electronic device 39, such as smartphone 40 or smartwatch 42 of FIG. 2, the user 11 may launch a dedicated mobile software application ("app") or a web-based applet, such as NIKE+®, that collaborates with a server-class (backend or middleware) computer (e.g., remote host system 34) to communicate with the various peer devices on decentralized computing system 30. During a communication session with the host system 34, for example, the user 11 may purchase a pair of the footwear 10 using a corresponding feature provisioned by the app. The user 11 enters personal information and a method of payment to complete the transaction. Upon completion of a validated payment, the host system 34 receives, e.g., from an online store transaction module or an approved third-party electronic payment system, a transaction confirmation to indicate a validated transfer of the footwear 10 to the user 11 has been completed. As indicated above, validated transfer of the footwear 10 may be effectuated through any available means, including at a brick-and-mortar store, through an online auction website, an aftermarket consumer-to-consumer trade/sale, etc.

Method 100 continues to decision block 103 to determine if the user 11 has procured a cryptocurrency wallet or other similarly suitable digital blockchain locker that is operable, for example, to upload and maintain location and retrieval information for digital assets that are encrypted and stored in a decentralized manner. A cryptocurrency wallet typically stores public and private key pairs, but does not store the cryptocurrency itself; the cryptocurrency is decentrally stored and maintained in a publicly available blockchain ledger. With the stored keys, the owner may digitally sign a transaction and write it to the blockchain ledger. A platform-dictated smart contract associated with the locker may facilitate transfer of stored assets and create a verifiable audit trail of the same. If the user 11 has not already acquired a digital blockchain locker (Block 103=NO), the method 100 continues to predefined process block 105 to set up a blockchain locker. By way of non-limiting example, user 11 may be prompted to visit or may be automatically routed to any of an assortment of publicly available websites that offer a hardware wallet for cold storage of cryptocurrency and digital assets, such an ERC20-compatible Ethereum wallet provided by MyEtherWallet.

Once the system confirms that the user 11 has a suitable digital blockchain locker, the method 100 may automatically link, or prompt the user 11 to link, the digital blockchain locker to a personal user account (e.g., a NIKEPLUS® account profile), as portrayed at process block 107 of FIG. 4. This may require the remote host system 34 retrieve a unique owner ID code (e.g., CryptoKick Owner ID 48 of FIG. 2) associated with the purchasing party (e.g., user 11) from an encrypted relational database (e.g., provisioned through cloud computing system 36). At this time, a unique physical shoe ID code (CryptoKick Physical ID 50 of FIG. 2) associated with the purchased footwear 10 may be linked to the user's personal account.

Upon determining that the user 11 has acquired a digital blockchain locker (Block 103=YES), or after linking the user's blockchain locker to their personal user account (Block 107), the method 100 continues to input/output block 109 to enable or "unlock" a cryptographic digital asset associated with the footwear 10 transacted at process block 101. As indicated above, after purchasing the footwear 10, the CryptoKick Physical ID or a universally recognized UPID product code may be used to retrieve a collectible CryptoKick, which is generally composed of a collectible digital shoe 44 and a unique NFT that is identified by an encrypted token key 46. A salesperson at a POS terminal or the user 11 employing their smartphone 40 may scan the UPID or UPC on the shoe 10 or a box storing therein the shoe 10. Alternatively, the user 11 may be prompted to carry out a "treasure hunt" using a digital camera on their smartphone to scan various UPIDs throughout a brick-and-mortar store until they scan one that is linked to a KickID. Enabling a cryptographic digital asset may be automatic, random, systematic, prize based, or any logically appropriate manner.

After receiving confirmation that a cryptographic digital asset has been authorized at input/output block 109, the method 100 generates a cryptographic digital asset for the transacted article of footwear. This may comprise generating a unique, encrypted asset code with an address, a token, and a public and private key pair, as denoted at predefined process block 111. Host system 34 may transmit the token, with the public key and the owner ID, to a distributed blockchain ledger to record and peer-validate transfer of the cryptographic digital asset to the user 11 on a transaction block. The method 100 continues to process block 113 to link the cryptographic digital asset with the unique owner ID code. This control logic may comprise executable instructions for assigning the encrypted asset code to the user 11 and storing the public and private keys in the user's digital blockchain locker.

With continuing reference to FIG. 4 the method 100 proceeds to process block 115 to produce the virtual representation or "digital art" of the cryptographic digital asset. Continuing with the footwear example of FIG. 2, the virtual representation may include a computer-generated avatar of the shoe 10 or a limited-edition artist rendition of the shoe 10. It is also envisioned that one or more attributes of the virtual representation of the cryptographic digital asset may be created, in whole or in part, via the user 11. A machine learning function may be executed at predefined process block 117 in order to generate image features through a neural network. Upon completion of the digital art, the image may be uploaded to cloud computing system 36 at block 119. In addition, optional process block 121 may issue a digital notification, such as an email or push notification, to the user's smartphone 40, smartwatch 42, or other personal computing device, with all related information for accessing, transferring and intermingling the cryptographic digital asset. The remote host system 34 may operate as a web server hosting a web-based graphical user interface (GUI) that is operable to translate the data stored in the encryption keys into a visual image that is displayed to the user 11 at optional process block 123. Digital asset manipulation and use may also be effectuated through the user's digital blockchain locker. This may comprise posting the cryptographic digital asset to an online crypto-collectible marketplace for sale or breeding, as provided in optional process block 125.

Prospective and current owners of a cryptographic digital asset, such as the CryptoKick of FIG. 2, may buy and sell digital assets through one or more blockchain ledgers operating on the decentralized computing system 30. By way of example, and not limitation, a user may buy a new pair of highly sought after sneakers from a verified vendor who may provide authenticated provenance records for the sneakers. While the sneakers are in transit, the user may receive an email notification with detailed instructions for unlocking a CryptoKick once the shipment arrives. After receiving the shoe box containing the purchased sneakers, the user scans the box UPC with a barcode scan feature in a sneakers app operating on the user's smartphone. In the sneakers app, a new profile page is responsively enabled; the sneakers app opens the new profile page. For at least some applications, the new profile page is linked with, exported to, or initially enabled in the user's personal (NIKEPLUS®) account profile. Private and public blockchain platform keys are generated, genotype and phenotype data are created, this data is embedded in segments of the public key's alphanumeric code, and the virtual representation of the CryptoKick is engendered. The CryptoKick's blockchain data, token, etc., are assigned to the user's new address; the new profile page lists the CryptoKick the user has acquired.

A user may wish to lease, license, or assign his/her new CryptoKick to any of one or more prospective buyers. In one example, a seller (also referred to herein as "transferor" or "first party") offers to sell, and a buyer (also referred to herein as "transferee" or "second party") agrees to buy a CryptoKick for an agreed-upon sum (e.g., three (3) ETH). The buyer may be interested to make such as purchase as the available CryptoKick has one or more attributes (e.g., artist, body type, colorway, etc.) the buyer is looking to add to a collection. The seller may initiate the sale process by marking a specific CryptoKick in the sneaker app as "For Sale" via a corresponding soft-key "auction" button. Sally may set a minimum bid and/or a buy now price, and provide an auction time window of a selected number of hours, days, weeks, etc. The sneaker app may present the seller with a share modal in which he/she can either share the auction via usual social media, or present a quick-response (QR) code for a potential buyer to scan. The buyer may then scan the QR code using a smartphone digital camera through operation of a scan feature in the sneaker app, and transmit the requisite funds (e.g., 3 ETH) to the auction site. The seller's sneakers app notifies him/her of the payment; the seller is prompted to agree to a terms of sale and finalize the transaction. The CryptoKick is then transferred from the first party to the address of the second party.

Owners of cryptographic digital assets may wish to intermingle or "breed" their digital assets with other digital assets to create asset "offspring," such as schematically shown in FIG. 6. A first digital asset owner and a second digital asset owner may wish to collaborate and crossbreed their digital assets 82, 84 in order to create a new cryptographic digital asset. The first owner may be set as a "primary artist" if his/her digital asset has attributes desired by the second owner. In this instance, the second owner may initiate a smart contract with the first owner to collaborate. One or both parties may fund the contract with physical or digital currency, e.g., to pay for the transfer, a "collab fee" set by the breeding host site, and an optional siring fee for the second owner's siring services. Once both parties agree to and sign the breeding contract, one or both parties may be prompted to select one or more traits from their "parent" digital asset to transfer to the resultant "progeny" digital asset. Alternatively, the breeding host site may employ a breeding algorithm to build a new digital asset from two or more preexisting digital assets.

A "Collab Science" Algorithm may be employed to determine which contributing cryptographic digital asset will be designated as the sire, determine which contributing cryptographic digital asset will be designated as the dam, and determine which code subsets from each parent asset will be employed to build the cryptographic token key for the resultant digital asset. For example, the token keys for the two parent digital assets, DA1 and DA2, may appear as:
 DA1: 4352635657387611432650689898388672080892866850020829309339781214
 DA2: 1997670191981520482540801616208235668515393854245661572126051434

The CollabScience algorithm may use a random number generator (RNG) or other applicable means to generate a random number, e.g., between 0 and 65535. In accord with this example, the random number may be 21123. Once generated, the CollabScience algorithm may convert the resultant number 21123 to a binary code: 0101001010000011. Concomitantly, with the first number in the binary code being zero (0), the first parent digital asset DA1 is designated as the sire and corresponds to all zeros in the string; with the first parent digital asset DA1 being designated as the sire, the second parent digital asset DA2 is automatically designated as the dam and corresponds to all ones in the string.

Continuing with the above example, the CollabScience algorithm segments the parent token keys into multi-digit code subsets or "chunks"; in this example, each parent token key is broken into sixteen (16) 4-digit code subsets:
 Segmented DA1: ['4352', '6356', '5738', '7611', '4326', '5068', '9898', '3886', '7208', '0892', '8668', '5002', '0829', '3093', '3978', '1214']
 Segmented DA2: +['1997', '6701', '9198', '1520', '4825', '4080', '1616', '2082', '3566', '8515', '3938', '5424', '5661', '5721', '2605', '1434']

The CollabScience algorithm then builds a new token ID for the resultant "progeny" digital asset based on the digits in the random number, with the sixteen chunks of the child token key being sequentially assigned a one or a zero based on the binary code of the above-generated random number. From this example, the first number in the binary code version of the random number is zero; the first parent digital asset DA1 is the designated sire, which corresponds to zero; as a result, the first chunk in the child token key will be copied from the first chunk of the sire and is, thus, set to 4352. Next, the second number in the binary code version of the random number is one; the second parent digital asset DA2 is the designated dam, which corresponds to one; as a result, the second chunk in the child token key will be copied from the second chunk of the dam and is, thus, set to 6701, and so on and so forth until all sixteen chunks in the child token key are filled with corresponding chunks from the parent token keys. The resultant new array for the child digital asset DA3 will therefore look like:
 Segmented DA3: +['4352', '6701', '5738', '1520', '4326', '5068', '1616', '3886', '3566', '0892', '8668', '5002', '0829', '3093', '2605', '1434']

The CollabScience algorithm produces the new token key ID from the array as:
 4352670157381520432650681616388635660892-86685002082930932605143

The CollabScience algorithm then processes the cryptographic digital asset, produces the virtual representation of the new asset, and assigns the asset to the buyer's digital blockchain locker.

It is envisioned that other techniques may be employed to determine the attributes of a progeny digital asset. For instance, a Punnett Square may be implemented to express the dominant and recessive traits ("genes") from the two parent digital assets, and create probabilities of a trait expression in an offspring digital asset. A Punnett Square is a graphical mechanism used to calculate a mathematical probability of a child asset inheriting a specific trait from two parent assets. The resultant array is provide by arranging the genotypes of one parent across the top of a table and that of the other parent down one side to discover all of the potential combinations of genotypes that can occur in a child given the genotypes of the parents. As seen in FIG. 2, the genotype and phenotype information contained in encrypted token key 46 includes the digital shoe's: breeding attributes ("collab"), materials information, make data ("family"), manufacturing requirements ("heat"), color combination ("colorway"), future attributes, model data, and image background information.

Epigenetic factors may result in heritable phenotype changes that do not involve alterations in an underlying DNA sequence. In some instances, genotypic changes in an encrypted token key may be caused by real world and/or virtual interactions, leading to alterations of a cryptographic digital asset's phenotypic characteristics. A gene representing high heat and rare heat could be changed from Hhrr to HHRR due to epigenetic factors like the following: usage of real-world shoes may increase a likelihood of a genetic mutation or passing of a "good qualities" variation of genes to offspring; real world workouts, like running or sports, may increase a good gene mutation or increase speed of maturity of a progeny asset; checking into stores or other real-world criterion may lead to positive gene mutation, passing of "good traits" to offspring, speed up maturity; time-dependent breeding that prevents two cryptographic digital assets from crossbreeding before both assets reach a minimum age, otherwise breeding may fail or increase probability of passing "bad qualities" genes to progeny; unique breeding times may cause genetic mutations; frequent interactions (e.g., trading, selling, buying, and collaboration) with other assets or other apps may lead to positive gene mutation, passing of "good traits" to offspring, or speed up maturity.

In some embodiments, a cryptographic digital asset may have its underlying genotypic information or phenotypic expression altered (e.g., mutated or edited) using an acquired cryptographic digital attribute (an "attribute pack"). The cryptographic digital attribute may include a subset of the genotypic and/or phenotypic traits that is less than a complete expression of a cryptographic digital asset. In a shoe context, a CryptoKick attribute pack may include genotypic and/or phenotypic information related to one or more discrete features of the digital shoe, though fewer features than a complete CryptoKick. Example attributes may include a style of a heel counter, laces, toe bumper, logo, colorway, and the like. When the cryptographic digital attribute is intermingled with the cryptographic digital asset, one or more of the genotypic code segments or phenotypic expressions may either be directly replaced with those of the asset, or may be bred to create a progeny attribute that involves a probabilistic combination of the preexisting attribute and the attribute expressed in the attribute pack. The resulting, mutated/edited digital asset (and/or asset ID code) may then be recorded to the distributed blockchain ledger.

The ability to edit and/or mutate discrete attributes of a user's digital asset promote both user engagement and enable broad options for brand promotion. More specifically, cryptographic digital attribute packs may be released to mutate/modify an asset to include a particular sports team's colors, to include unique features or attributes from a key influencer's similar cryptographic digital asset, or the like. By analogy, this ability for targeted mutation/gene editing may be similar to CRISPR technologies in the biotech landscape. In some implementations, where breeding rules govern the effect of the attribute pack on the digital asset, there may be a probabilistic and/or uncertain result in how the newly introduced attribute is expressed in the resulting cryptographic digital asset. For example, if the attribute pack includes a team-specific colorway, the breeding/intermingling may result in different expressions if intermingled with different underlying assets (or even different expressions if applied to two identical underlying assets). In some embodiments, CryptoKick attribute packs may be provided in a similar manner as full fledged CryptoKicks, however in one embodiment, instead of being provided with a completed article of footwear or apparel, they may instead be provided with the sale of a customizing product or service (i.e., a component or modification kit that is intended to modify an article of footwear or apparel though is short of being a full article of footwear or apparel itself). Examples may include the sale of custom laces, temporary appliqués (e.g., logos or panels adhered via hook and loop fastener, snaps, or non-permanent adhesives), kits for customizing, and/or services for customizing (e.g., dying services, sublimation, sale or application of dye kits or pigments, deposition layering, coloration layering, application of optical effects—modification of structural color, static color, or pearlescence; laser etching services, acid dye washing services; additive manufacturing—3d printing, dimensional painting, etc).

To better control the distribution of the cryptographic digital attribute packs, each may be recorded to a distributed blockchain ledger upon creation, thus providing each attribute pack a separate existence. In some embodiments, each cryptographic digital attribute pack may include a smart contract that terminates the attribute pack's existence or ability to be subsequently intermingled with a different digital asset. As such, in some embodiments, the attribute pack may be a single-use ability to edit or mutate an underlying digital asset. Further, in some embodiments, the smart contract aspects may time-limit the ability to intermingle with an underlying digital asset.

Figure 7:
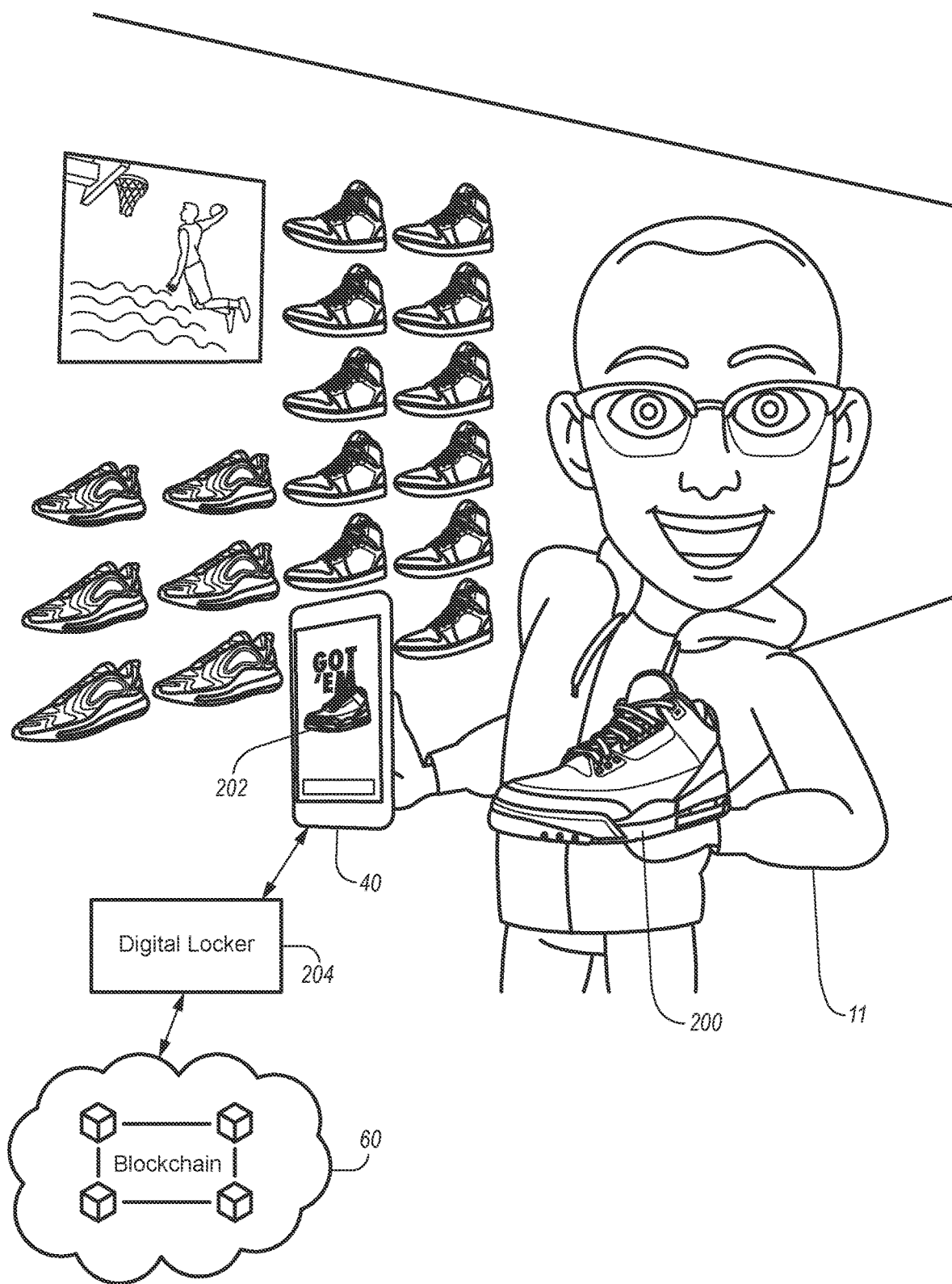
FIG. 7 is a functional illustration of the acquisition of a cryptographic digital asset via a linked retail product.

As noted above, FIG. 7 schematically illustrates a method of acquiring a digital collectable or attribute pack that may be linked or coordinated with the sale of a physical product. Namely, as shown in FIG. 7, the user 11 brings a device (i.e., smart phone device 40) in proximity to a physical product 200 that includes an identifier (UPID), such as a QR Code, barcode, digital image, RFID tag, NFC tag, BLUETOOTH id, registry entry in an embedded processor, or some other machine readable code. This code may then be recognized by the phone 40 either optically, via radio frequency communication, magnetic properties, or via wired data communication. Following the identification/recognition of the UPID, the phone 40 may initiate the transfer and/or original provisioning of a digital asset 202 linked with that product 200 to the user's locker 204 that is in communication with a blockchain service/network 60. In an extension of this concept, the transfer of the digital asset 202 may be further secured using a PIN, cryptographic key, access code, or the like that may be provided, for example, on a receipt following the user's purchase of the product 200.

In one embodiment, should the user 11 acquire a CryptoKick with the purchase of a pair of sneakers, and then subsequently return the sneakers, a smart contract associated with the CryptoKicks may unravel the acquisition and automatically return the token and full right to the CryptoKick back to the company/retailer. In the event the purchaser sold/traded the CryptoKick to a bona fide purchaser (BFP) prior to returning the shoes, this secondary transaction may similarly be unraveled/reversed. In some embodiments, with the reversal of this secondary transaction, the BFP may be presented with the option to re-acquire the CryptoKick from the company/retailer for a predetermined price (e.g., a prevailing price for the asset, at a discount to a prevailing price, at a fixed price set prior to market release, or for a nominal amount). In another embodiment, the BFP of the CryptoKick may have the first right of refusal to acquire/purchase the retuned physical product. This may be significant in the case of limited release sneakers that are, by definition, scarce.

FIG. 8 schematically illustrates a method of acquiring a digital collectable or attribute pack such as during a promotional giveaway. As shown, the user 11 may locate a virtual object 210, such as a CryptoKick, in an arena 212 using an AR capability of a smart phone 40. In this example, the CryptoKick may be "hidden" in a scoreboard 214, though may be freely recognizable using an app on the phone that interfaces with a camera on the phone. The app may illustrate the virtual object on a display when the camera recognizes a specific environmental optical pattern (i.e., the scoreboard within the arena), and when the phone is geolocated within a particular area (i.e., via GPS sensing, beacons, geofencing techniques, wi-fi connectivity, and the like. Once located, the user 11 may be prompted to scan a unique code, such as the barcode on a ticket, a unique code provided on a program or physical item (e.g., noise maker, light stick, towel) that may be placed on the user's seat prior to the game. This code may be associated and/or linked with an allocated, registered, or pre-provisioned cryptographic asset and KickID. Once this code is scanned or entered, the phone 40 may initiate the transfer of the digital asset 202 to the user's locker 204 that is in communication with a blockchain service/network 60. For example, the phone 40 may communicate the code to a server, where an associated KickID may be looked up and then transferred to a locker associated with the user's ID.

In an even more general brand promotion case, the need to locate a virtual object may not be strictly required to receive the CryptoKick or attribute pack. Said another way, a server, such as a middleware server, may receive an indication that a user device is at a particular venue during a particular event. This indication may be derived from GPS-based position coordinates that are determined from a GPS receiver on the user device. More specifically, the determined GPS coordinates may be compared to a predefined geofenced area around the venue and the indication may represent whether the device is inside or outside of the venue. Alternatively, the indication may result from the device being in proximity to one or more 802.11 or BLUETOOTH beacons located at the venue, or optical recognition, via a camera on the device, of specific visual characteristics of the venue. The server may then prompt the user, via the user device, to scan a unique identifier that should be readily obtainable by a person in attendance at the event. Example unique identifiers may include a ticket barcode, a code on a physical object, a code on the user's seat, a code printed on a merchandise receipt, or the like. Once this code is scanned or entered, the server may receive an indication of the user's unique ID and the unique scanned code. The server and/or the user device may initiate the transfer of the digital asset 202 to the user's locker 204 that is in communication with a blockchain service/network 60. Other conditions, such as discovery of an AR object at the venue or the occurrence of a specific event may add further conditional layers that must be fulfilled prior to the server executing the transfer. In some embodiments, the user device may record the device's presence at the location and/or time, and claiming of the CryptoKick may be available for a predetermined period of time following the event.

In some embodiments, the ability to acquire the CryptoKick may further be initiated by an aspect of the game/event, rather than by locating an AR object or by presence at the event alone. Examples of such triggering events may include, for example, a shut-out (hockey/baseball), no-hitter (baseball), 50+ point individual performance (basketball), a triple-double (basketball), a hat trick (soccer/hockey), a scoreless quarter/period/half (basketball, hockey, soccer), and overtime/extra innings. In such an embodiment, the occurrence of the event may trigger an alert on the user's device 39, which would prompt the user to scan their ticket to facilitate the transfer. In one embodiment, to eliminate a secondary market for ticket stubs, the app on the user's device that facilitates the notification may require that the scan occur only within a predetermined geofence and/or time of the game/event. In a further extension, the marketplace (described above) may further permit the user 39 to prospectively sell the unvested right to the CryptoKick if the triggering event were to occur. This would resemble the user writing and selling a tradable option to the CryptoKick that either expires worthless, or results in the option purchaser acquiring the CryptoKick.

It should be appreciated that in any of the above-described CryptoKick acquisition methods, an attribute pack may be obtained through similar means/techniques. For example, in one embodiment, a user's presence at a sporting event may enable them to receive an attribute pack comprising a colorway of one of the team's colors. This attribute pack may then be intermingled with an existing CryptoKick to mutate or edit an existing colorway attribute toward the team color scheme. In some embodiments, transmitting the unique scanned code may then direct an application or browser on the user's device to a virtual storefront where colorway attribute packs of each teach may be made available, and where the user is prompted to select one for acquisition. Similar virtual storefront techniques may similarly be useful for the selection and transfer of CryptoKicks as well.

Figure 9:
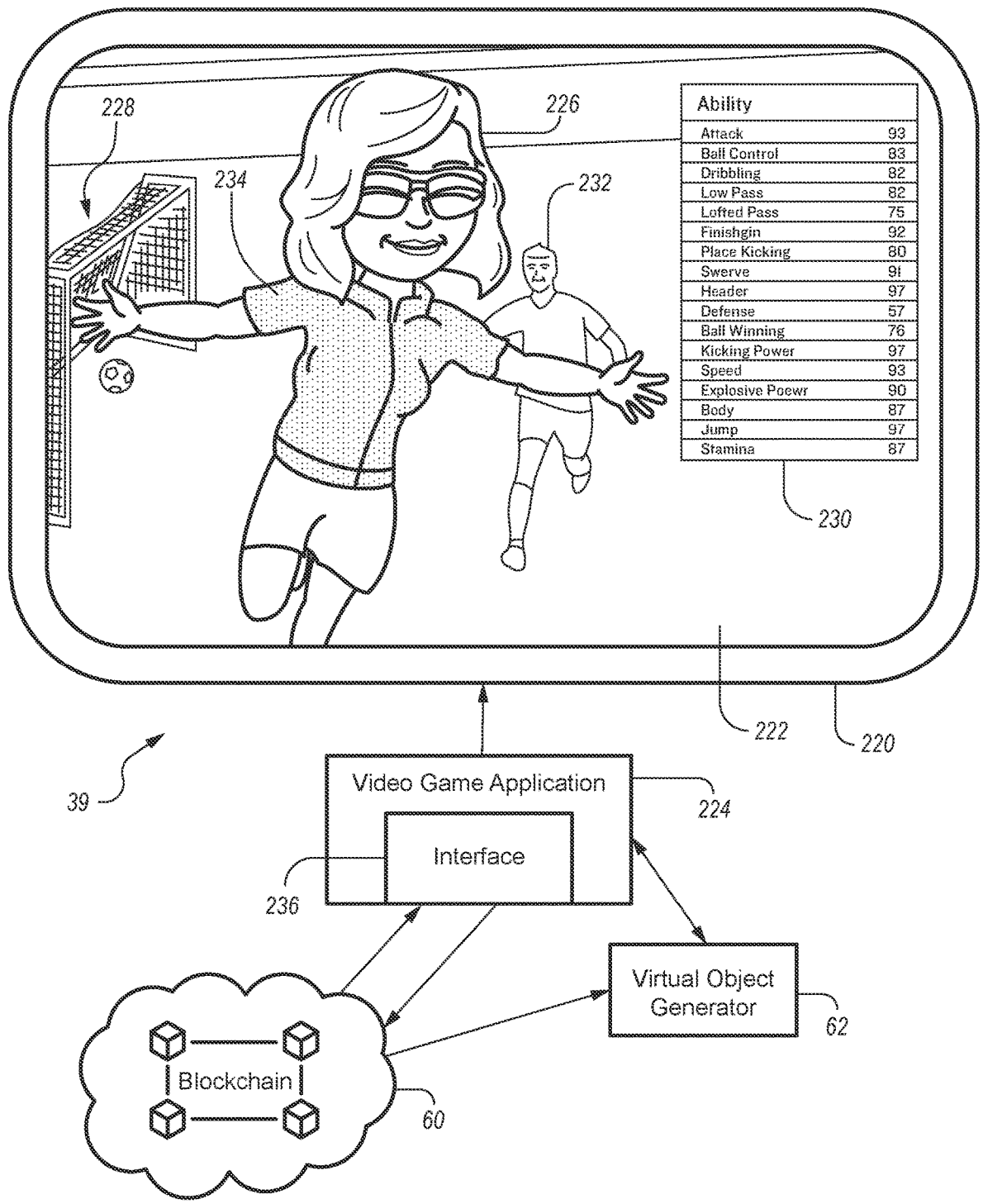
FIG. 9 is an illustration of a representative graphical user interface (GUI) of a personal computing device illustrating the use of genotypic and phenotypic characteristics of a cryptographic digital asset within a video game.
Figure 10:
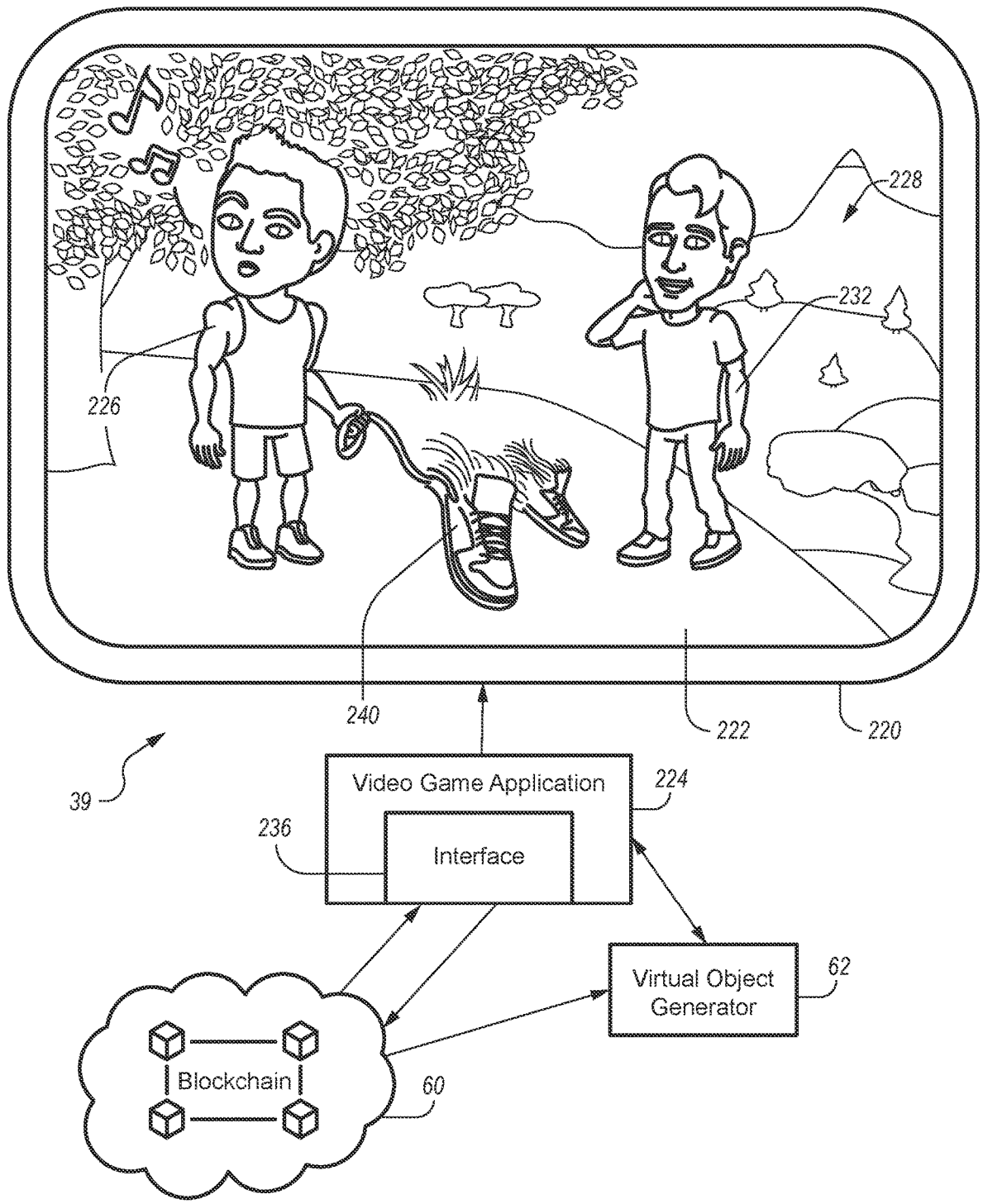
FIG. 10 is a functional illustration of a representative graphical user interface (GUI) of a personal computing device operating on a decentralized computing system for provisioning virtual user interactions that alter genotypic and phenotypic characteristics of a cryptographic digital asset in accordance with aspects of the present disclosure.

FIGS. 9-10 schematically illustrate a video game interface 220 including a display 222. The video game interface 220 and/or display 222 may be integral with a user device 39 (e.g., a smart phone 40 or tablet), or may be a standalone gaming console coupled with a display 222. The device 39 may generally be configured to execute a digital application 224 that requires user input to control a virtual character 226 within an environment 228. The character 226 may include or be defined by a plurality of attributes 230 that may affect how the character 226 behaves, responds, or performs within the environment 230, and/or how the character 226 interacts with other characters 232 that may be controlled by the application 224 or by other users in a networked environment.

In one context, the character 226 may be an athlete and the environment 228 may be a sporting environment. FIG. 9 illustrates such a character 226 as a footballer, and the environment 228 as a football pitch within a stadium. The character's attributes 230 may include, for example, speed, ball control, passing, defense, kicking power, balance, and stamina (among others). In one embodiment, the character 226 may be outfit/skinned with a digital collectable (e.g., an article of apparel 234) that may be uniquely backed by a token on the blockchain 60. In an embodiment, the digital collectable may have been acquired in any one of the manners described herein. In one configuration, the application 224 may access the genetic code of the digital asset on the blockchain 60 via an API or other software interface 236 (i.e., an embodiment of the $3^{rd}$ party interface 66 described above) and/or may access the phenotype expression of the object either via an integrated software decoder or by accessing a networked virtual object generator 62 of the kind described above. In one configuration, one or more of the attributes 230 may be positively or negatively influenced by the genetic code or phenotype expression of the object 234. While FIG. 9 illustrate the object as an article of apparel, it may similarly be an article of footwear, an object the character may use, a piece of sporting equipment, or the like.

Further building upon the notion of the CryptoKick as property, in one embodiment, a user or company may rent out or lease out the use of the digital collectable within a video game for a period of time. In one embodiment, the leasing may be constrained so that only one instance of a particular user's asset exists in any particular context. For example, a user may own full rights to an exclusive CryptoKick. That user may concurrently lease out the CryptoKick for use in Basketball Game A for 1 week, Soccer Game B for 2 weeks, and $1^{st}$ Person Shooter Game C for 3 weeks.

Another option may include programming a cryptographic digital asset as a virtual "pet" that a user cares for and helps to grow from a baby to an adult. FIG. 10, for example, illustrates a user's avatar 226 taking his pet CryptoKicks 240 for a virtual walk and interacting with an avatar of another user 232 within an environment 228 representative of a virtual world. As mentioned above, such virtual interactions may affect the evolution, value, rate of maturation, visual appearance, marketability, etc., of the pet CryptoKick. The attributes of the digital asset may change with age or be unlocked over time. A user may care for the virtual pet directly or source to a third party (e.g., through ETH payment or transaction by other means). The virtual pet may go through various life stages, and concomitantly unlock different real-life sneaker versions of itself that a user can then purchase in stores.

Referring again to FIG. 9, much like the virtual pet of FIG. 10, in some embodiments, gameplay, use of the digital asset, or improvements in a character's level, experience, or accomplishments may operatively alter/modify one or more genotypic and/or phenotypic attributes of the digital asset/CryptoKick. Similarly, in some embodiments, gameplay, use of the digital asset, or improvements in a character's level, experience, or accomplishments may operatively modify the effect that the digital asset has on the character's ability or gameplay. For example, in one embodiment, achievement of a new level, tournament victory, global ranking above a predefined threshold, or other similar accomplishments may modify an attribute of the CryptoKick to have a distinctive or limited availability appearance, colorway, skin, or the like. Likewise, in some embodiments, such accomplishments may serve as a multiplier on the effects that the digital asset imparts to the character.

Figure 11:
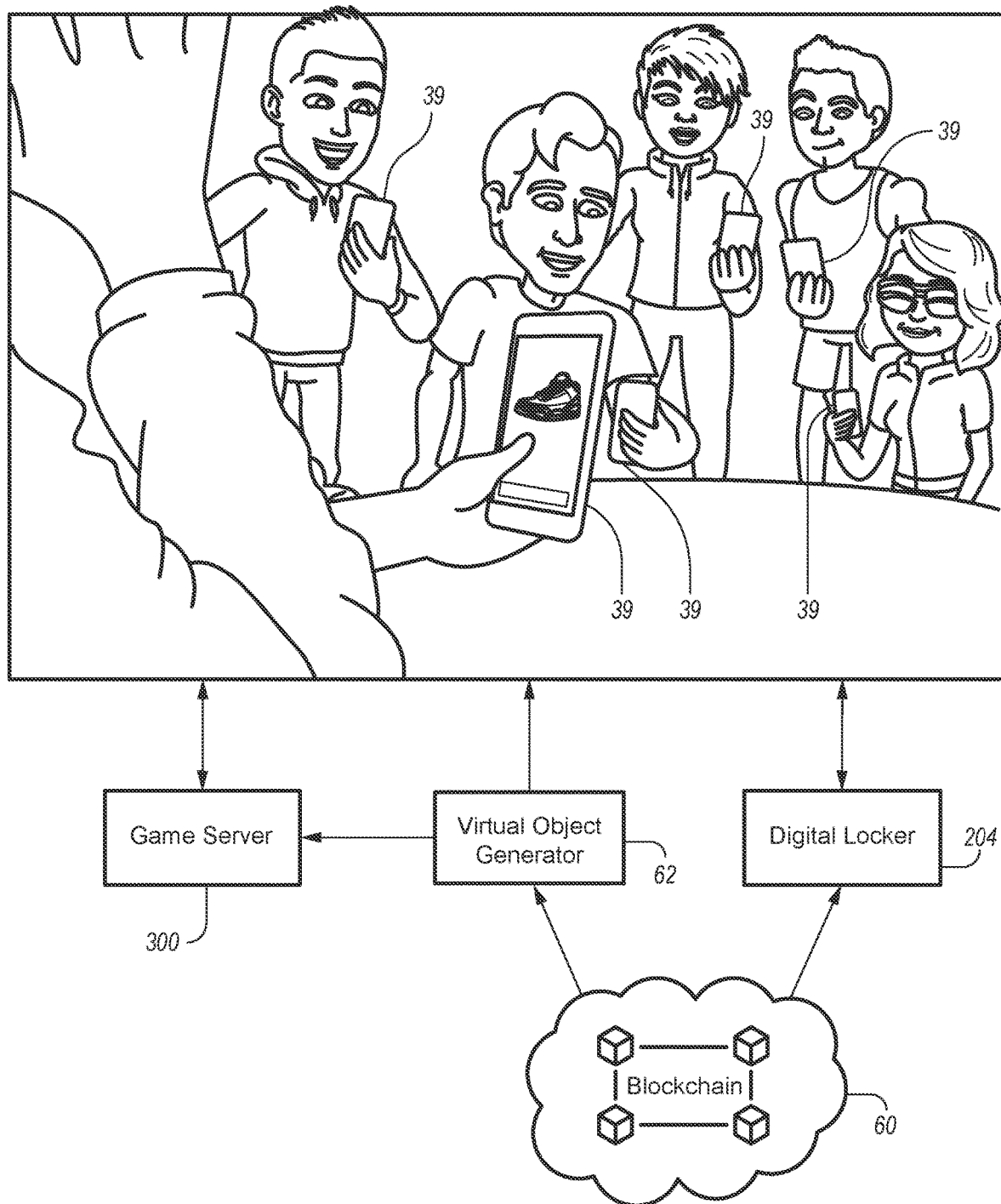
FIG. 11 is a functional illustration of a plurality of users engaged in a collaborative experience such as participating in a digital collectable card game.

Referring to FIG. 11, in some embodiments, the digital assets may take the form of, or may be used in a digital collectable card game (DCCG). In such a game, each user may have a collection of digital assets, each with a different set, balance, or weighting of attributes/attribute scores, and/or different features, abilities, or powers. In some embodiments, users may take turns playing individual cards or groups of cards in an effort to win according to the rules set by the game.

While collectable card games, themselves, are generally well known, the use of the presently described digital assets may provide a unique extension of these games. Furthermore these games may serve as an additional use and motivation for collecting the digital assets. By uniquely securing each digital asset to an immutable database such as a blockchain 60, each player's collection of cards and their required strategy for using those cards will likely be unique also.

In such an embodiment, a game server 300 may be in communication with a plurality of different user devices 39. As with above, the user devices 39 may be smartphones 40, smart watches 42, tablet computers, laptop computers, web enabled devices, or other such devices that are capable of networked communication with the server 300. Each user device 39 may be linked to a separate digital locker 204, which may permit the user to access their securely stored digital assets from the blockchain 60. Each asset may be represented as a separate digital card on the user's device, and may have its own unique attribute set (i.e., part of the phenotype). In one embodiment, a virtual object generator 62 may be in communication with the user devices 39 and/or the game server 300 to create the expression of the virtual object from the genotypic information associated with the token on the blockchain 60. The game server 300 may manage the rules of the game, including maintaining a plurality of user accounts, instructing a first user, via the user's device 39, when it is time to play, and altering an attribute of a second user's account based on the receipt of digital asset data from the first user. The received digital asset data may correspond to a digital asset played by the first user via the first user's device.

In one embodiment, the game server 300 may not have any stored understanding of a user's collection of digital assets until digital asset data is received. As such, in this embodiment, the asset collection for a user may be maintained solely by the user's device. In an alternate embodiment, a user's collection of assets may be registered with the user's account maintained by the game server 300. In this configuration, the digital asset data may simply be an indication of which card in the user's account was played.

While FIG. 11 is intended to illustrate a plurality of users engaged in a DCCG, in an alternate configuration, the illustration may be representative of a meet-up where a plurality of users come to a common location for the purpose of breeding their CryptoKicks. Such an event may be coordinated by a central server that is linked to user accounts in a local area. Alternatively, users may have the ability to sponsor events and/or broadcast their own location for others to connect and/or create a user-initiated meet-up or invitation.

In some embodiments, the attributes of a cryptographic digital asset can be directly related to corresponding attributes of a real-world shoe for purposes of production. Optionally, digital asset attributes may be linked to a bill of materials for cost calculation and as a control mechanism. Resulting offspring may be restricted to having phenotype characteristics that can be created in the real world based on manufacturing capabilities, materials, and other factors. As CryptoKicks and CollaboKicks change owners due to selling, trading, buying, and collaboration, the resultant transaction history is tracked within the blockchain. Once a CollaboKick or CryptoKick that does not currently exist is created in real life, previous owners/users may be notified of such real-life existence and may be given an option to purchase the sneaker.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

As noted in the disclosure, the present system may utilize public or private blockchain infrastructures, distributed ledgers, append-only databases, and the like. In one example, the presently described cryptographically secured digital assets may initially be stored/secured to a private blockchain that resides on infrastructure maintained by a single entity, or consortium of entities. Each entity may agree upon a common form, or data construct for the infrastructure, though assets of any one entity may be maintained by that entity. Such a model may provide for the sharing of network and infrastructure costs/resources, while permitting each entity to maintain their own asset independence. To further public trust, assets created on this private or semi-private blockchain may be transferrable to public chains at the discretion of the user (potentially subject to one or more conditions of transfer).

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features. Additional features may be reflected in the following clauses:

Clause 1: A method of brand promotion using cryptographic digital assets, the method comprising: provisioning a plurality of non-fungable tokens, each registered with an immutable database or blockchain, and each corresponding to a unique digital asset; associating each token with a unique, machine readable identification code; providing each machine readable identification code to a different respective individual from a plurality of individuals; providing software code to a user device associated with at least one of the plurality of individuals; wherein the user device includes a camera, a display, and a location recognition circuit, the software code configured to: cause the user device to discover a virtual image within a real-world environment, display a prompt, via the display, for the user to scan the machine readable identification code upon discovery of the virtual image; recognize a machine readable identification code, and cause the token associated with the machine readable identification code to be transferred to a digital locker associated with the individual or user device.

Clause 2: The method of clause 1, wherein the token includes genotypic information corresponding to one or more phenotypic expressions of a virtual object.

Clause 3: The method of any of clauses 1-2, wherein the software code causes the user device to discover the virtual image within the real-world environment via augmented reality.

Clause 4: The method of any of clauses 1-3, wherein the software code causes the user device to recognize an environment according to an optical image perceived by the camera and a location determined by the location recognition circuit; display the optical image on the display, overlay the displayed optical image with the virtual image at a predetermined location within the displayed environment.

Clause 5: The method of any of clauses 1-4, wherein the unique digital asset includes a virtual object comprising a plurality of attributes, and where each attribute is determinable, at least in part, according to a portion of code associated with the token of that unique digital asset.

Clause 6: The method of clause 5, wherein at least one of the plurality of attributes is influenced in its expression by use of the virtual object.

Clause 7: The method of any of clauses 1-6, wherein the location recognition circuit is a GPS receiver.

Clause 8: A method of brand promotion using cryptographic digital assets, the method comprising: provisioning a plurality of non-fungable tokens, each registered with an immutable database or blockchain, and each corresponding to a different respective physical retail product selected from a plurality of physical retail products; associating each token with a unique, machine readable identification code; providing the machine readable identification code associated with a first physical retail product to a retail purchaser of the first physical retail product; receiving a request from a user device associated with the retail purchaser to transfer the non-fungable token associated with the first physical retail product to a digital locker associated with the retail purchaser or user device, wherein the request includes a code included in or derived from the machine readable identification code associated with the first physical retail product.

Clause 9: The method of clause 8, further comprising initiating a request to the immutable database or blockchain to transfer the non-fungable token associated with the first physical retail product to the digital locker associated with the retail purchaser.

Clause 10: The method of any of clauses 8-9, further comprising: providing software code to the user device; wherein the user device includes a camera, a display, and a location recognition circuit, the software code configured to: cause the user device to discover a virtual image within a real-world environment, display a prompt, via the display, for the user to scan the machine readable identification code upon discovery of the virtual image; and recognize a machine readable identification code.

Clause 11: The method of clause 10, wherein the software code causes the user device to recognize the machine readable identification code through at least one of optical recognition via the camera, RFID, NFC, or BLUETOOTH communications.

Clause 12: The method of any of clauses 8-11 wherein providing the machine readable identification code associated with a first physical retail product to a retail purchaser of the first physical retail product includes at least one of: including the machine readable identification code on a tag, label, or sticker attached to the first retail product; printing the machine readable identification code on a box, container, or packaging material enclosing the first physical retail product; printing the machine readable identification code on a receipt provided to the retail purchaser; printing a first portion of the machine readable identification code on the box, container, or packaging material enclosing the first physical retail product, and printing a second portion of the machine readable identification code on a receipt provided to the retail purchaser.

Clause 13: The method of clause 12, wherein the software code causes the user device to discover the virtual image within the real-world environment via augmented reality.

Clause 14: The method of any of clauses 12-13, wherein the software code causes the user device to recognize an environment according to an optical image perceived by the camera and a location determined by the location recognition circuit; display the optical image on the display, overlay the displayed optical image with the virtual image at a predetermined location within the displayed environment.

Clause 15: The method of any of clauses 8-14, wherein the token includes genotypic information corresponding to one or more phenotypic expressions of a virtual object.

Clause 16: The method of any of clauses 8-15, wherein the unique digital asset includes a virtual object comprising a plurality of attributes, and where each attribute is determinable, at least in part, according to a portion of code associated with the token of that unique digital asset.

Clause 17: The method of clause 16, wherein at least one of the plurality of attributes is influenced in its expression by use of the virtual object.

Clause 18: A method comprising: providing a virtual object to a user, wherein the virtual object includes a plurality of attributes, and wherein each attribute of the plurality of attributes is at least partially derived from a code associated with a non-fungible token registered to an immutable database or blockchain.

Clause 19: The method of clause 18, wherein providing the virtual object to the user includes causing the non-fungible token to be transferred to an account associated with the user.

Clause 20: The method of clause 19, further comprising receiving value from the user in consideration for causing the non-fungible token to be transferred to the account associated with the user.

Clause 21: The method of any of clauses 18-20, wherein providing the virtual object to the user includes making the virtual object available to the user within a video game.

Clause 22: The method of clause 21, wherein the video game includes an avatar, character, or athlete within a virtual environment, and wherein the avatar, character, or athlete is controlled by user input received via a user device.

Clause 23: The method of clause 22, wherein the virtual object is an article of footwear or an article of apparel.

Clause 24: The method any of clauses 22-23, wherein the avatar, character, or athlete includes a plurality of character attributes, each having a respective attribute score that affects a behavior, performance, or ability of the avatar, character, or athlete within the environment; and wherein integration of the virtual object with the avatar, character, or athlete operatively modifies at least one attribute score.

Clause 25: The method of clause 21, wherein the video game is a digital collectable card game, and wherein the virtual object is represented as a digital collectable card.

Clause 26: The method of any of clauses 21-25, further comprising providing an indication of the use of the virtual object within the video game to a remote server, and wherein the indication of use of the virtual object is operative to alter at least one of the plurality of attributes of the virtual object.

Clause 27: A computerized system for implementing any of the methods of clauses 1-16.

Clause 28: A method for automating generation of cryptographic digital assets associated with articles of footwear, each of the articles of footwear including an upper for attaching to a foot of a user and a sole structure attached to the upper for supporting thereon the foot of the user, the method comprising: receiving, via a middleware server computer over a distributed computing network from a remote computing node, a transaction confirmation indicative of a validated transfer of an article of footwear from a first party to a second party; determining, via the middleware server computer from an encrypted relational database, a unique owner identification (ID) code associated with the second party; generating a cryptographic digital asset associated with the article of footwear, the cryptographic digital asset including a digital shoe and a unique digital shoe ID code; linking, via the middleware server computer, the cryptographic digital asset with the unique owner ID code; and transmitting, via the middleware server computer to a distributed blockchain ledger, the unique digital shoe ID code and the unique owner ID code to record transfer of the cryptographic digital asset to the second party on a transaction block.

Clause 29: The method of clause 28, wherein the unique digital shoe ID code includes a cryptographic token key with a code string segmented into a series of code subsets, wherein a first plurality of the code subsets includes data indicative of attributes of the digital shoe.

Clause 30: The method of clause 29, wherein the first plurality of the code subsets includes genotype and phenotype data for the digital shoe.

Clause 31: The method of any of clauses 29-30, wherein a second plurality of the code subsets includes data indicative of attributes of the article of footwear.

Clause 32: The method of clause 31, wherein the second plurality of the code subsets includes colorway, materials, manufacturing, make, and/or model data for the article of footwear.

Clause 33: The method of any of clauses 28-32, further comprising: responsive to receiving the transaction confirmation, transmitting a notification to the second party with information for accessing the cryptographic digital asset; and receiving, via the middleware server computer from a handheld personal computing device of the second party, a scanning confirmation verifying a universal product code (UPC) and/or a unique product identifier number (UPIN) corresponding to a make and a model of the article of footwear has been scanned, wherein linking the cryptographic digital asset with the unique owner ID code is responsive to receipt of the scanning confirmation.

Clause 34: The method of any of clauses 28-33, further comprising, responsive to receiving the transaction confirmation, transmitting a notification to the second party with a unique key with a hashed address to a cryptographic token.

Clause 35: The method of any of clauses 28-34, further comprising: receiving a digital breeding solicitation with a request to intermingle the cryptographic digital asset with a third-party cryptographic digital asset; and generating a progeny cryptographic digital asset with a combination of one or more features from the cryptographic digital asset and one or more features from the third-party cryptographic digital asset.

Clause 36: The method of clause 35, wherein: the unique digital shoe ID code includes a first cryptographic token key with a first code string segmented into a series of first code subsets, a first of the first code subsets including data indicative of attributes of the digital shoe; the third-party cryptographic digital asset includes a second cryptographic token key with a second code string segmented into a series of second code subsets, a first of the second code subsets including data indicative of attributes of a third-party digital shoe; and the progeny cryptographic digital asset includes a third cryptographic token key with a third code string segmented into a series of third code subsets, a first of the third code subsets including the data from the first of the first code subsets, and a second of the third code subsets including the data from the first of the second code subsets.

Clause 37: The method of clause 36, wherein the first of the first and third code subsets both share a first distinct alphanumeric sequence, and wherein the first of the second code subsets and the second of the third code subsets share a second distinct alphanumeric sequence.

Clause 38: The method of any of clauses 36-37, wherein generating the progeny cryptographic digital asset includes applying a random number generator to: designate one of the cryptographic digital asset or the third-party cryptographic digital asset as a sire; designate another of the cryptographic digital asset or the third-party cryptographic digital asset as a dam; and determine which of the third code subsets corresponds to which of the first code subsets and which of the of third code subsets correspond to which of the second code subsets.

Clause 39: The method of any of clauses 28-38, further comprising: receiving a digital transfer proposal with a request to transfer the cryptographic digital asset to a third party; determining a new unique owner ID code associated with the third party; linking the cryptographic digital asset with the new unique owner ID code; and transmitting the unique digital shoe ID code and the new unique owner ID code to the distributed blockchain ledger for recordation on a new transaction block.

Clause 40: The method of clause 39, further comprising receiving a new transaction confirmation indicative of a new validated transfer of the article of footwear from the second party to the third party.

Clause 41: The method of any of clauses 28-40, further comprising generating, via the middleware server computer, a smart contract operable to authenticate ownership and to track future transaction of the cryptographic digital asset.

Clause 42: The method of any of clauses 28-41, wherein the unique owner ID code is linked with a cryptocurrency wallet registered with the distributed blockchain ledger.

Clause 43: The method of any of clauses 28-42, wherein the transaction confirmation includes a universal product code (UPC) and/or a unique product identifier number (UPIN) corresponding to a make and a model of the article of footwear.

Clause 44: A decentralized computing system for automating generation of cryptographic digital assets associated with articles of footwear, each of the articles of footwear including an upper for attaching to a foot of a user and a sole structure attached to the upper for supporting thereon the foot of the user, the decentralized computing system comprising: a wireless communications device configured to connect with a remote computing node over a distributed computing network; a cryptographic digital asset registry storing digital shoes and unique digital shoe ID codes associated with multiple cryptographic digital assets; and a middleware server computer operatively connected to the wireless communications device and the cryptographic digital asset registry, the middleware server computer being programmed to: receive, over the distributed computing network from the remote computing node, an electronic transaction confirmation indicative of a validated transfer of an article of footwear from a first party to a second party; retrieve, from an encrypted relational database, a unique owner identification (ID) code associated with the second party; generate a cryptographic digital asset associated with the article of footwear, the cryptographic digital asset including a digital shoe and a unique digital shoe ID code; link the cryptographic digital asset with the unique owner ID code in the cryptographic digital asset registry; and transmit the unique digital shoe ID code and the unique owner ID code to a distributed blockchain ledger to record transfer of the cryptographic digital asset to the second party on a transaction block.

Clause 45: The decentralized computing system of clause 44, wherein the unique digital shoe ID code includes a cryptographic token key with a code string segmented into a series of code subsets, wherein a first plurality of the code subsets includes data indicative of attributes of the digital shoe.

Clause 46: The decentralized computing system of clause 45, wherein a second plurality of the code subsets includes data indicative of attributes of the article of footwear.

Clause 47: The decentralized computing system of any of clauses 44-45, wherein the middleware server computer is further programmed to: responsive to receiving the transaction confirmation, transmit a digital notification to the second party with information for accessing the cryptographic digital asset; and receive, from a handheld personal computing device of the second party, a scanning confirmation verifying a universal product code (UPC) and/or a unique product identifier number (UPIN) corresponding to a make and a model of the article of footwear has been scanned, wherein linking the cryptographic digital asset with the unique owner ID code is responsive to receipt of the scanning confirmation.

Clause 48: The decentralized computing system of any of clauses 44-47, wherein the middleware server computer is further programmed to, responsive to receiving the transaction confirmation, transmit a digital notification to the second party with a unique key with a hashed address to the cryptographic token.

Clause 49: The decentralized computing system of any of clauses 44-48, wherein the middleware server computer is further programmed to: receive a digital breeding bid from the second party with a request to intermingle the cryptographic digital asset with a third-party cryptographic digital asset; and generate a progeny cryptographic digital asset with a combination of one or more features from the cryptographic digital asset and one or more features from the third-party cryptographic digital asset.

Clause 50: The decentralized computing system of clause 49, wherein: the unique digital shoe ID code includes a first cryptographic token key with a first code string segmented into a series of first code subsets, a first of the first code subsets including data indicative of attributes of the digital shoe; the third-party cryptographic digital asset includes a second cryptographic token key with a second code string segmented into a series of second code subsets, a first of the second code subsets including data indicative of attributes of a third-party digital shoe; and the progeny cryptographic digital asset includes a third cryptographic token key with a third code string segmented into a series of third code subsets, a first of the third code subsets including the data from the first of the first code subsets, and a second of the third code subsets including the data from the first of the second code subsets.

Clause 51: The decentralized computing system of clause 50, wherein generating the progeny cryptographic digital asset includes applying a random number generator to: designate one of the cryptographic digital asset or the third-party cryptographic digital asset as a sire; designate another of the cryptographic digital asset or the third-party cryptographic digital asset as a dam; and determine which of the of third code subsets correspond to the first code subsets and which of the of third code subsets correspond to the second code subsets.

Clause 52: The decentralized computing system of any of clauses 44-51, wherein the middleware server computer is further programmed to: receive a digital transfer proposal with a request to transfer the cryptographic digital asset to a third party; determine a new unique owner ID code associated with the third party; link the cryptographic digital asset with the new unique owner ID code; and record the unique digital shoe ID code and the new unique owner ID code on a new transaction block with the distributed blockchain ledger.

Clause 53: A method of event-based distribution of a cryptographic digital asset comprises: receiving, from a computing device associated with a user, an indication that the computing device is located at a predetermined venue within a predetermined window of time; receiving, from the computing device, a unique owner identification (ID) code associated with the user; receiving, from the computing device, a unique code acquired by the user; determining a unique digital asset ID code corresponding to the received unique code, the unique digital asset ID code representative of the cryptographic digital asset; and transmitting a cryptographic block to a distributed blockchain ledger to record transfer of the cryptographic digital asset to the user, the cryptographic block comprising both the unique digital asset ID code and the unique owner ID code.

Clause 54. The method of clause 53, wherein the cryptographic digital asset includes genotype data representative of a digital shoe or article of apparel.

Clause 55: The method of clause 53, wherein the cryptographic digital asset includes genotype data that is representative of an attribute of a digital shoe or article of apparel though is not representative of an entire digital shoe or article of apparel.

Clause 56: The method of clause 55, further comprising modifying a preexisting digital asset having genotype data representative of a digital shoe or article of apparel using the genotype data representative of the attribute of a digital shoe or article of apparel.

Clause 57: The method of any of clauses 53-56, wherein the indication that the computing device is located at the predetermined venue comprises an indication of whether GPS coordinates of the computing device are within a predefined geofence or closed geographic boundary.

Clause 58: The method of any of clauses 53-57, wherein the indication that the computing device is located at the predetermined venue comprises an indication of whether the computing device is in proximity to an 802.11 or BLUETOOTH beacon.

Clause 59: The method of any of clauses 53-58, wherein the indication that the computing device is located at the predetermined venue comprises an image acquired by the computing device, or a representation thereof, from which one or more visual attributes of the venue may be identified.

Clause 60: The method of any of clauses 53-59, wherein the received unique code comprises a code acquired from a ticket to an event at the venue.

Clause 61: The method of any of clauses 53-59, wherein the received unique code comprises a code that is scanned from a tangible object within the venue or from a merchandise receipt generated within the venue.

Clause 62: The method of any of clauses 53-61, further comprising receiving an indication that a conditional event has occurred during the predetermined window of time; and wherein the transmitting of the cryptographic block to the distributed blockchain ledger occurs only after the indication is received that the conditional event has occurred.

Clause 63: The method of any of clauses 53-62, wherein determining the unique digital asset ID code comprises: directing an application or an internet browser running on the computing device to a virtual storefront display comprising a plurality of different displayed cryptographic digital assets; receiving an indication of a selection of one of the plurality of different displayed cryptographic digital assets; and wherein the determined unique digital asset ID code corresponds to both the received unique code and the selected one of the plurality of different displayed cryptographic digital assets.

Clause 64: The method of any of clauses 53-63, further comprising: receiving a digital transfer proposal with a request to transfer the cryptographic digital asset to an acquiring party; determining a unique owner ID code of the acquiring party; linking the cryptographic digital asset with the unique owner ID code of the acquiring party; and transmitting the unique digital asset ID code and the unique owner ID code of the acquiring party to the distributed blockchain ledger for recordation on a new transaction block.

Clause 65: The method of any of clauses 53-64, wherein the unique digital asset ID code includes a cryptographic token key with a code string segmented into a series of code subsets, wherein a first plurality of the code subsets includes genotype data corresponding to one or more phenotypic expressions the digital asset.

Clause 66: The method of clause 65, wherein the digital asset is a computer-generated digital shoe.

Clause 67: The method of clause 66, wherein the plurality of attributes of the computer-generated digital shoe includes at least one of: colorway, materials, manufacturing, make, and/or model data.

Clause 68. The method of clause 65, further comprising exporting at least one of the digital asset ID code or at least one of the plurality of attributes of the digital asset to a digital video game application such that the digital asset is represented within the digital application and modifies one or more aspects of the gameplay of the digital video game application.

What is claimed:

1. A method of event-based distribution of a cryptographically secured digital asset, the method comprising:
receiving, from a computing device associated with a user, an indication that the computing device is located at a predetermined venue within a predetermined window of time;
receiving, from an external source separate from the computing device associated with the user, an indication that a conditional triggering event has occurred at the predetermined venue and during the predetermined window of time;
receiving, from the computing device, a unique owner identification (ID) code associated with the user;
transmitting a request to record a transfer of the cryptographically secured digital asset to the user on a distributed blockchain ledger, the request comprising both a unique digital asset ID code and the unique owner ID code; and
wherein:
transmitting the request to record the transfer of the cryptographically secured digital asset on the distributed blockchain ledger occurs only after the indication is received that the conditional event has occurred
the conditional triggering event comprises a statistic of an athlete or sports team crossing a predetermined threshold at the predetermined venue; and
the indication that the conditional triggering event has occurred is an electronic message received from a blockchain oracle.

2. The method of claim 1, further comprising:
following receipt of the indication that the conditional triggering event has occurred during the predetermined window of time, receiving, from the computing device, a unique code acquired by the user; and
determining the unique digital asset ID code from the received unique code, the unique digital asset ID code representative of the cryptographically secured digital asset.

3. The method of claim 2, wherein the received unique code comprises a code that is scanned from a tangible object within the venue or from a merchandise receipt generated within the venue.

4. The method of claim 2, wherein the received unique code comprises a code acquired from a ticket to an event at the venue.

5. The method of claim 1, further comprising:
following receipt of the indication that the conditional triggering event has occurred during the predetermined window of time, directing an application or an internet browser running on the computing device to a virtual storefront display comprising a plurality of different displayed cryptographically secured digital assets;
receiving an indication of a selection of one of the plurality of different displayed cryptographically secured digital assets; and
wherein the unique digital asset ID code corresponds to the selected one of the plurality of different displayed cryptographically secured digital assets.

6. The method of claim 1, wherein the cryptographically secured digital asset includes genotype data representative of a digital shoe or article of apparel.

7. The method of claim 1, wherein the cryptographically secured digital asset includes genotype data that is representative of an attribute of a digital shoe or article of apparel though is not representative of an entire digital shoe or article of apparel.

8. The method of claim 7, further comprising modifying a preexisting digital asset having genotype data representative of a digital shoe or article of apparel using the genotype data representative of the attribute of a digital shoe or article of apparel.

9. The method of claim 1, wherein the indication that the computing device is located at the predetermined venue comprises an indication of whether GPS coordinates of the computing device are within a predefined geofence or closed geographic boundary.

10. The method of claim 1, wherein the indication that the computing device is located at the predetermined venue comprises an indication of whether the computing device is in proximity to an 802.11 or BLUETOOTH beacon.

11. The method of claim 1, wherein the indication that the computing device is located at the predetermined venue comprises an image acquired by the computing device, or a representation thereof, from which one or more visual attributes of the venue may be identified.

12. The method of claim 1, further comprising:
receiving a digital transfer proposal with a request to transfer the cryptographically secured digital asset to an acquiring party;
determining a unique owner ID code of the acquiring party;
linking the cryptographically secured digital asset with the unique owner ID code of the acquiring party; and
transmitting the unique digital asset ID code and the unique owner ID code of the acquiring party to the distributed blockchain ledger for recordation on a new transaction block.

13. The method of claim 1, further comprising exporting at least one of the digital asset ID code or at least one of a plurality of attributes of the digital asset to a digital video game application such that the digital asset is represented within the digital application and modifies one or more aspects of the gameplay of the digital video game application.

14. A method of event-based distribution of a cryptographically secured digital asset, the method comprising:
receiving, from a computing device associated with a user, an indication that the computing device is located at a predetermined venue within a predetermined window of time;
receiving, from a computing server, an indication that a conditional triggering event has occurred during the predetermined window of time, the conditional triggering event comprising a statistic derived from a sporting event occurring at the predetermined venue;
receiving, from the computing device, a unique owner identification (ID) code associated with the user;
transmitting a request to record a transfer of the cryptographically secured digital asset to the user on a distributed blockchain ledger, the request comprising both a unique digital asset ID code and the unique owner ID code;
wherein transmitting the request to record the transfer of the cryptographically secured digital asset to the user occurs only after the indication is received that the conditional event has occurred; and
the indication that the conditional triggering event has occurred is an electronic message received from a blockchain oracle.

15. The method of claim 14, wherein the cryptographically secured digital asset comprises an attribute pack operative to modify one or more attributes of a preexisting digital asset.

16. The method of claim 15, wherein the attribute pack includes genotype data that is representative of an attribute of a digital shoe or article of apparel though is not representative of an entire digital shoe or article of apparel;

the method further comprising modifying the preexisting digital asset having genotype data representative of a digital shoe or article of apparel using the genotype data representative of the attribute of a digital shoe or article of apparel.

* * * * *